US010104132B2

(12) United States Patent
Logue et al.

(10) Patent No.: US 10,104,132 B2
(45) Date of Patent: *Oct. 16, 2018

(54) NETWORK-ASSISTED FABRIC PAIRING

(71) Applicant: Google Inc., Mountain View, CA (US)

(72) Inventors: Jay D. Logue, San Jose, CA (US);
Andrew William Stebbins, Mountain View, CA (US); Roger Loren Tinkoff, Piedmont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,827

(22) Filed: Dec. 30, 2014

(65) Prior Publication Data

US 2017/0048280 A1 Feb. 16, 2017
US 2018/0270276 A9 Sep. 20, 2018

Related U.S. Application Data

(63) Continuation of application No. 14/582,062, filed on Dec. 23, 2014, now Pat. No. 9,590,976.

(60) Provisional application No. 62/061,593, filed on Oct. 8, 2014.

(51) Int. Cl.
*H04L 29/06* (2006.01)
*H04L 12/28* (2006.01)
*H04W 12/04* (2009.01)
*H04L 12/24* (2006.01)
*H04L 29/12* (2006.01)
*H04W 4/80* (2018.01)

(52) U.S. Cl.
CPC ...... *H04L 65/1069* (2013.01); *H04L 12/2818* (2013.01); *H04L 41/0806* (2013.01); *H04L 61/1511* (2013.01); *H04L 63/0823* (2013.01); *H04W 4/80* (2018.02); *H04W 12/04* (2013.01)

(58) Field of Classification Search
CPC . H04L 41/0806; H04L 63/0876; H04W 12/06
See application file for complete search history.

(56) References Cited

U.S. PATENT DOCUMENTS

| 9,590,976 B2 | 3/2017 | Logue et al. |
| 2009/0013210 A1* | 1/2009 | McIntosh ............ H04L 41/0672 714/4.1 |
| 2010/0246434 A1 | 9/2010 | Wang et al. |
| 2011/0211219 A1 | 9/2011 | Bradley et al. |
| 2011/0264730 A1* | 10/2011 | Dattagupta ......... H04L 12/2809 709/203 |

(Continued)

OTHER PUBLICATIONS

International Search Report and Written Opinion for PCT Application No. PCT/US2015/054286 dated Jan. 21, 2016; 12 pgs.

(Continued)

*Primary Examiner* — Ellen Tran
(74) *Attorney, Agent, or Firm* — Colby Nipper

(57) ABSTRACT

Systems and methods for joining a device to a fabric using an assisting device include an indication to add a joining device to a fabric. If the joining device supports network-assisted fabric pairing, a first connection is established between a commissioning device and the assisting device. The assisting device also connects to a joining device. Through the assisting device, the commissioning device and the joining device establish a communication channel over which fabric credentials may be sent.

22 Claims, 15 Drawing Sheets

(56) References Cited

U.S. PATENT DOCUMENTS

| | | | |
|---|---|---|---|
| 2012/0147802 A1* | 6/2012 | Ukita | H04W 52/0277 370/311 |
| 2013/0055363 A1 | 2/2013 | Dattagupta et al. | |
| 2013/0198816 A1 | 8/2013 | Bohli et al. | |
| 2014/0040444 A1* | 2/2014 | Lee | H04L 41/0806 709/222 |
| 2014/0280938 A1 | 9/2014 | Kadaba et al. | |
| 2014/0310777 A1 | 10/2014 | Truskovsky et al. | |
| 2014/0369231 A1* | 12/2014 | Chen | H04L 41/0806 370/254 |
| 2014/0376405 A1* | 12/2014 | Erickson | H04W 52/0212 370/254 |
| 2016/0105424 A1 | 4/2016 | Logue et al. | |

OTHER PUBLICATIONS

"Notice of Allowance", U.S. Appl. No. 14/582,062, dated Oct. 27, 2016, 15 pages.

"Non-Final Office Action", U.S. Appl. No. 14/582,062, dated Jun. 17, 2016, 17 pages.

\* cited by examiner

NETWORK-ASSISTED FABRIC PAIRING

CROSS REFERENCE TO RELATED APPLICATIONS

This application is a Continuation Application of, and claims priority to, U.S. patent application Ser. No. 14/582,062, entitled "Network-Assisted Fabric Pairing", filed Dec. 23, 2014, which claims the benefits of Provisional Application Ser. No. 62/061,593 filed Oct. 8, 2014 entitled "Fabric Network" the entirety of which is incorporated by reference herein for all purposes.

BACKGROUND OF THE DISCLOSURE

This disclosure relates to systems, devices, methods, and related computer program products for smart buildings including the smart home. More particularly, this patent specification relates to adding devices to a preexisting fabric using devices already residing on the network.

Some homes today are equipped with smart home networks to provide automated control of devices, appliances and systems, such as heating, ventilation, and air conditioning ("HVAC") systems, lighting systems, alarm systems, and home theater and entertainment systems. Smart home fabrics may include one or more networks of devices interconnected to automation functions within the home. For example, a person may input a desired temperature and a schedule indicating when the person is away from home.

In some scenarios, it may be desirable to add new devices to the networks and/or fabrics in the smart home. However, in some scenarios, the devices being added have limited connectivity before being connected to other devices. For example, some joining devices may join to devices that are manually set to a network created by the joining devices. For example, a smartphone may be manually set to connect to the joining device on a WiFi network generated by the joining device. However, such manual setting of connecting networks use interactions with users that may decrease user experience and/or increase complexity of the pairing process.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for enabling devices to join devices to network and/or fabrics consisting of several networks and adding the devices to the network and/or fabrics. In some embodiments, these devices may be joined to a network by connecting to another device (e.g., smartphone) by having the other device change networks to a network hosted by the joining device. However, in such embodiments, the other device has to change networks, which may be tedious, annoying, and/or inefficient process that reduces possible automation of the joining process.

BRIEF DESCRIPTION OF THE DRAWINGS

Various aspects of this disclosure may be better understood upon reading the following detailed description and upon reference to the drawings in which.

DETAILED DESCRIPTION OF THE DISCLOSURE

Figure 1:
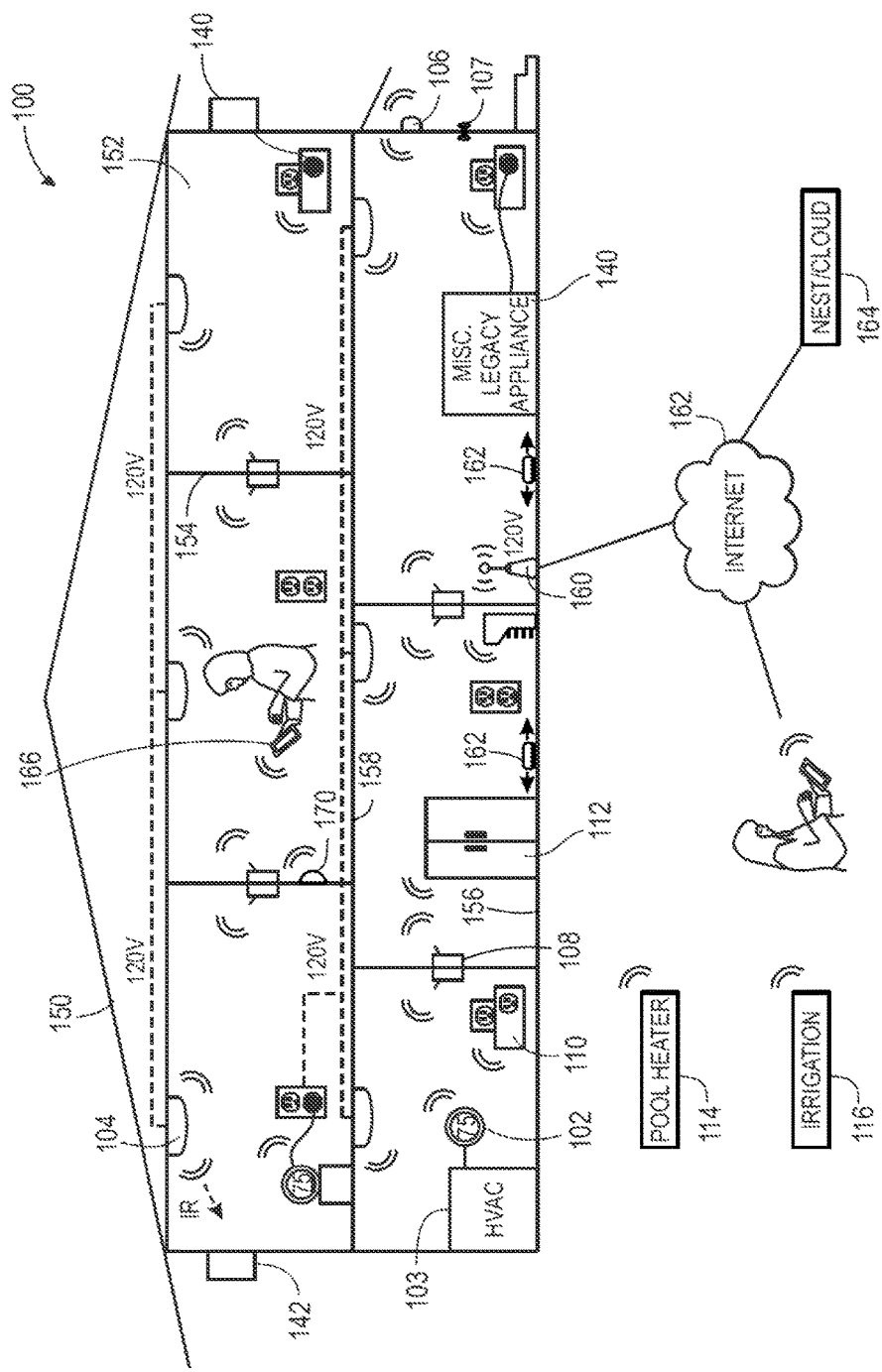
FIG. 1 illustrates an embodiment of a smart-home environment within which one or more of the devices, methods, systems, services, and/or computer program products described herein may be used, according to an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to network-assisted fabric pairing of devices using a network to as an extension of a fabric-pairing infrastructure to provide simplified pairing of additional devices to the fabric using the network. In short, a fabric device joining a network which supports network-assisted pairing may be able to form a connection via the network with a fabric device currently paired to the fabric when the fabric device supports network-assisted pairing. Using this connection, the joining device may receive network provisioning information and/or other information over this connection. Enabling the user to add devices within a single network provides a simplified in-band pairing mechanism that allows devices to be paired to a fabric without manually switching networks (e.g., WiFi) on a device thereby reducing or eliminating user interaction used to join the joining device to the fabric. This mechanism may be particularly advantageous when the joining device is not capable of automatically switching between networks in response to third-party instructions used to commission additional fabric devices. In other words, if the joining device is a hazard-detection device that includes a version of software that does not enable the device to switch WiFi network connections based on commands from a smartphone without causing the smartphone to join the device's own WiFi network, the device may instead connect to a different device already paired to a fabric using a network connection.

Terminology

As used herein, network refers to a data network communication that is wireless or wired in character. For example, the network may include an 802.15.4 network, an 802.11 network, or other suitable network types for communicatively coupling two or more devices. A fabric is a group of paired devices or nodes, which can communicate with each other securely without a connection to the cloud service. In some embodiments, all nodes on the same fabric belong to the same structure and are paired to the same account. A fabric structure is the physical environment in which a fabric-enabled product is installed (e.g., a home or apartment). In some embodiments, a structure may only contain at most one fabric. A fabric pairing process is the method by which a new device receives network provisioning information, joins or creates its structure's fabric, and pairs with its user's account via a service. In some embodiments, the fabric pairing process is performed completely using fabric protocol interactions. Network provisioning is the process by which a fabric device receives the information used to join the networks present in its structure. In some embodiments, this process is performed prior to fabric joining. Fabric joining is the process by which a device is provisioned with information used to securely communicate with other nodes on an existing fabric. In some embodiments, fabric joining is performed after network provisioning and before account pairing. Service provisioning and account pairing is the process by which a device is registered to an account via a cloud service. In some embodiments, the account pairing enables the user to remotely interact with the device, such as a remote interaction using a mobile device application. In some embodiments, the account pairing and service provisioning process also includes provisioning any information into the device that may be used to identify, authenticate, and connect to the service.

Additional device pairing is a fabric pairing process where a new device is installed in a structure with an existing fabric. In this case, devices on the existing fabric may assist in the pairing process to reduce the amount of user interaction to simplify the process from the user perspective. In some embodiments, some of the devices on the existing fabric may sleepy devices that periodically enter a low power state. In such embodiments, at least one device on the existing fabric is awake during this process for the new device to automatically receive network and fabric provisioning information from the devices already on the existing fabric. Thus, in some embodiments, the process may be delayed if no devices are awake. In other embodiments, the joining device, a service, or some other device may awaken at least one of the devices already on the existing network from a lower power state to initiate the pairing process.

As used herein, the device joining the network may be referred to as the joining device. Also, as used herein, a fabric commissioner is a device that orchestrates the fabric pairing process for the joining device via the fabric profiles for network, fabric, and service provisioning. In some embodiments, the commissioner may include a smart device (e.g., phone or tablet), computer, a device already on the fabric, or some other device that may be used to control and orchestrate the joining process. As used herein, an assisting device refers to an existing, paired fabric device that assists the joining device in the pairing process to reduce the amount of user interaction.

It should be appreciated that "smart home environments" may refer to smart environments or smart networks for any building type, such as single-family houses, duplexes, townhomes, multi-unit apartment buildings, hotels, retail stores, office buildings, industrial buildings, and any building that may include one or more smart devices.

It is to be further appreciated that while the terms user, customer, installer, homeowner, occupant, guest, tenant, landlord, repair person, user, and similar terms may be used to refer to a person or persons interacting with a smart device within the network via a user interface, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the units, and is also one of the users of the units. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the embodiments—for example, the password-protected network commissioning functionality described herein may be particularly advantageous where the landlord holds the sole password and can control network additions—such identity should not be construed in the descriptions that follow as necessarily limiting the scope of the present teachings to those particular individuals having those particular identities.

Smart Network

With the foregoing in mind, FIG. 1 illustrates an example of a smart-home environment 100, also referred to as a smart network, within which one or more of the devices, methods, systems, services, and/or computer program products described further herein can be applicable. The depicted smart-home environment 100 includes a structure 150, which can include, e.g., a house, office building, garage, or mobile home. In some embodiments, the devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes multiple rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes various devices, including intelligent, multi-sensing, network-connected devices that may integrate seamlessly with each other, with a central server, with a cloud-computing system, or some combination of these to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected doorbell devices 106 (hereinafter referred to as "smart doorbells 106"), and one or more intelligent, network-connected door locks 107 (hereinafter referred to as "smart door locks 107"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come). The smart door locks 107 may detect and toggle between a locked and unlocked condition for doors in the home, detect a person's approach to or departure from a respective door, detect whether a door is open or closed, or other suitable controls associated with a smart door lock.

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Further, in some embodiments, the smart-home environment 100 of FIG. 1 includes multiple intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, window sensors, security systems, and so forth. According to embodiments, the network-connected appliances 112 may be made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart door lock 107, the smart wall switches 108, the smart wall plugs 110, and other devices of the smart-home environment 100 may be modular and may be incorporated into older and new houses. For example, in some embodiments, the devices are designed around a modular platform consisting of two basic components: a head unit and a back plate, also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There are also many different versions for the head units, such as low-cost versions with few features, and then a progression of increasingly-capable versions, up to and including sophisticated head units with a large number of features. Thus, it should be appreciated that the various versions of the head units may be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room," "kitchen," and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information then may be used to obtain data helpful for determining optimal times for watering. Such data may include sun location information, temperature, dew point, soil type of the land on which the home is located, etc.

By virtue of network connectivity, one or more of the smart-home devices of FIG. 1 can also enable a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some embodiments, the device 166 may be connected to the smart network directly or through additional networks (e.g., WiFi) that are connected to the smart network using one or more devices (e.g., an edge router). In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. For example, a smart-home environment may receive communication from a mobile device of an individual who is known to be or who is registered as a guest or determined to be on a common network (e.g., SSID WiFi network) as the smart devices.

In some embodiments, in addition to containing processing and sensing capabilities, each of the devices 102, 104, 106, 107, 108, 110, 112, 114, 116, 162, 170 and other smart devices (collectively referred to as "the smart devices") may be capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For some embodiments, a user may be able to contact customer support using a device itself rather than needing to use other communication means such as a telephone or Internet-connected computer. Further, software updates can be automatically sent from the central server or cloud-computing system 164 to the smart devices (e.g., when available, when purchased, or at routine intervals).

As discussed below, the smart devices may be combined to create a mesh network. In some embodiments, this mesh network may include spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and may communicate using wireless protocols that requires very little power, such as ZigBee, 6LoWPAN, etc. Furthermore, some low-power nodes may also have a relatively low amount of memory to reduce power consumption. Thus, in some embodiments, these low-power nodes utilize streamlined messages and data formats of data. Further, some, but not all, low-power nodes are incapable of bidirectional communication. These low-power nodes send messages, but they are unable to "listen". Thus, other devices in the smart-home environment 100, such as the spokesman nodes, cannot send information to these low-power listening-only nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to some embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 107, 108, 110, 112, and 170) may function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 107, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency or an emergency drill. In some instances, to facilitate this, users provide pre-configuration information that indicates exit routes in the smart-home environment 100. For example, for each room in the house, the user may provide a map of the best exit route depending on availability of the route. In some situations the route may be blocked by a hazard, and an alternate route may be illuminated and indicated, if available. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Also included and illustrated in the smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, ZigBee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to some embodiments is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of multiple known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gait, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
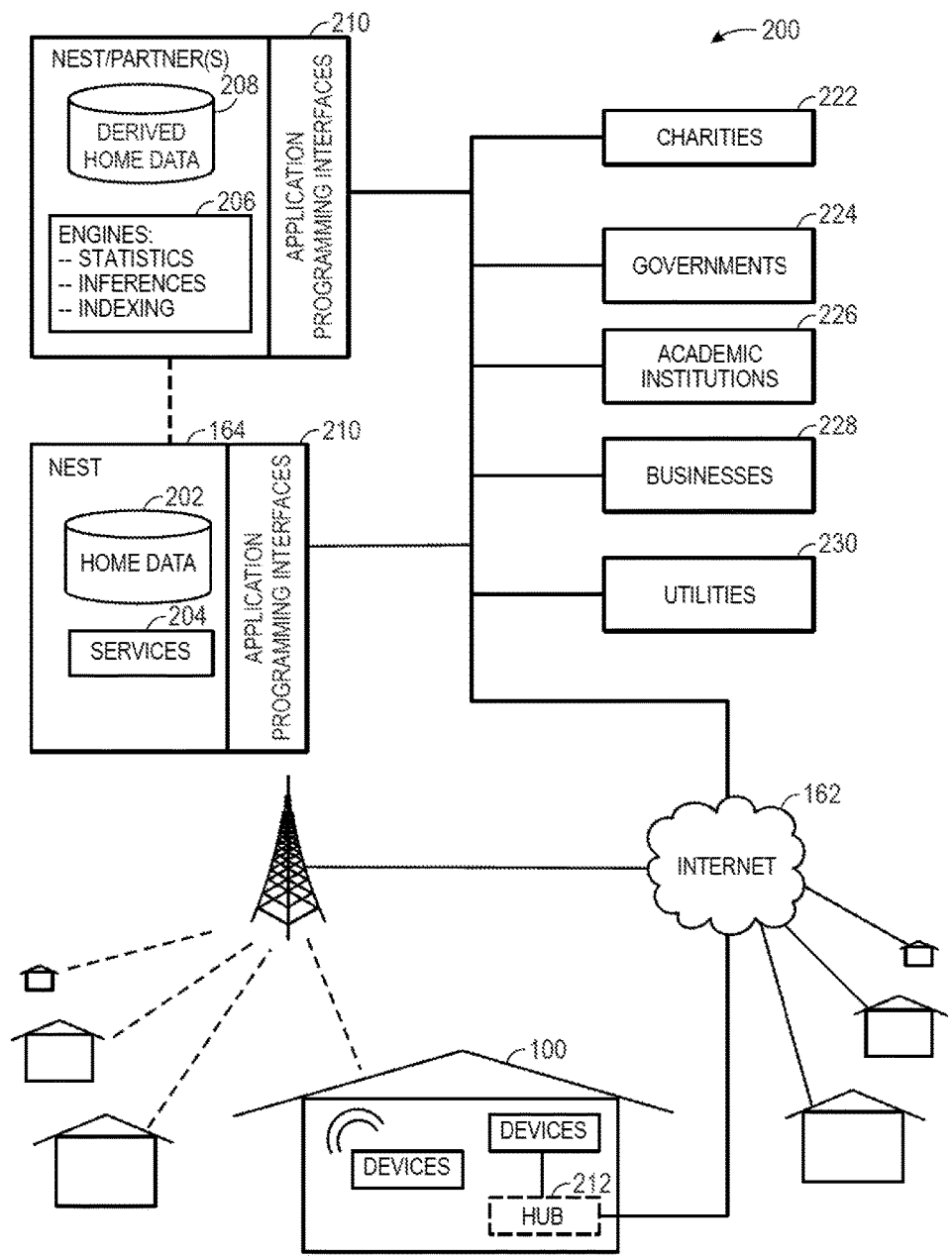
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which multiple smart-home environments, such as the smart-home environment 100 of FIG. 1, can be integrated. The extensible devices and services platform 200 includes remote servers or cloud computing architectures 164. Each of the smart devices can communicate with the remote servers or cloud computing architectures 164. For example, a connection to the Internet 162 can be established either directly (for example, using 3G/4G connectivity to a wireless carrier), through a wireless mesh network (which can be a scheme ranging from a simple wireless router, for example, up to and including an intelligent, dedicated whole-home control node), or through any combination thereof. The smart network may couple to the Internet 162 using a hub 212.

Although in some examples provided herein, the devices and services platform 200 communicates with and collects data from the smart devices of smart-home environment 100 of FIG. 1, it should be appreciated that the devices and services platform 200 may communicate with and collect data from multiple smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 may routinely collect data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, weather information, account information, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. Additionally or alternatively, if a neighbor's hazard detector detect smoke, neighboring houses may activate irrigation systems to reduce likelihood of a spread of fire. It should be appreciated that this safety network can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 may be coupled to and permit third-party systems to communicate with the central server or the cloud-computing system 164, including the services 204, the processing engine 206, the home data 202, and the derived home data 208. For example, APIs 210 may allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
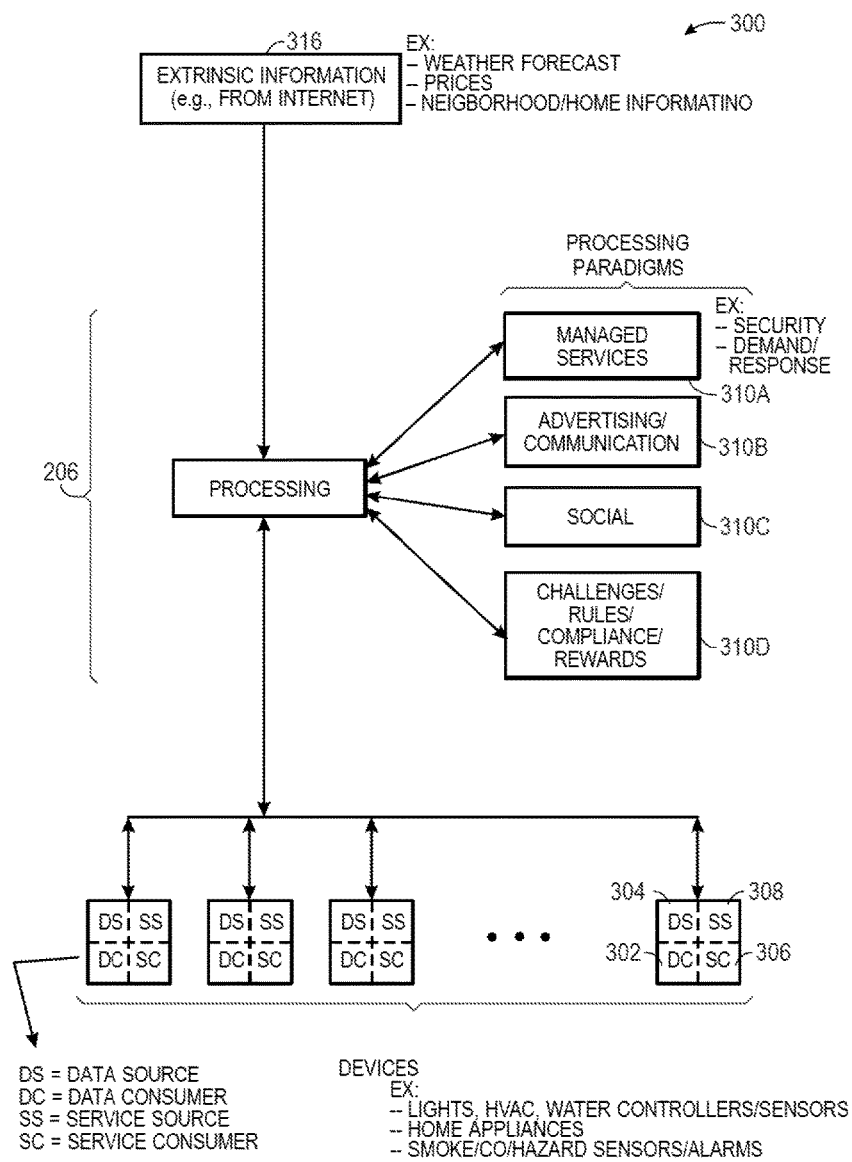
FIG. 3 illustrates a functional view of the extensible devices and services platform of FIG. 2, with reference to a processing engine as well as devices of the smart-home environment, according to an embodiment.

FIG. 3 illustrates a functional view 300 of the extensible devices and services platform 200 of FIG. 2, with particular reference to the processing engine 206 as well as devices, such as those of the smart-home environment 100 of FIG. 1. Even though devices situated in smart-home environments may have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310*a* that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310*b* that estimates characteristics (e.g., demographic information), desires and/or products of interest of a user based on device usage. Services, promotions, products or upgrades can then be offered or automatically provided to the user. Processing engine 206 can further include a social paradigm 310*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 may integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits may be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Smart Devices

Figure 4:
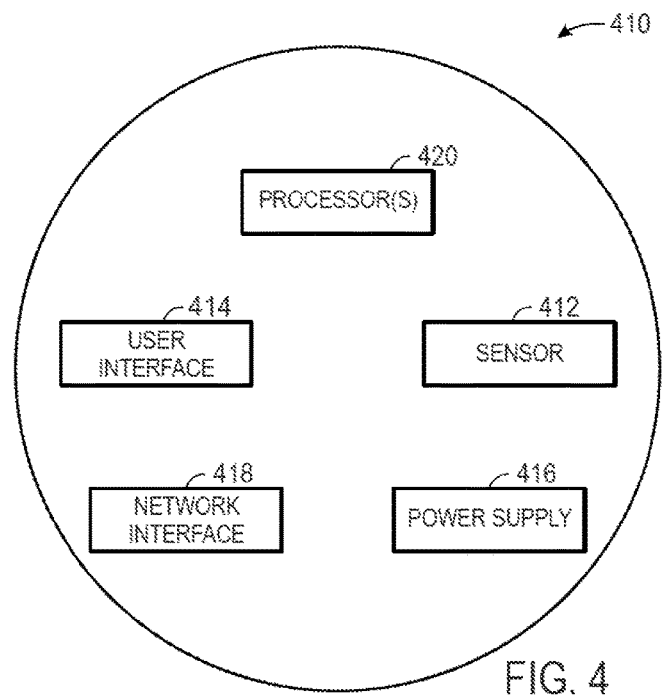
FIG. 4 illustrates block diagram view of a smart device that may securely communicate with other smart devices within the smart-home environment, according to an embodiment.

By way of introduction, FIG. 4 illustrates an example of a device 410 (e.g., thermostat and/or hazard detector) that may that may communicate with other like devices within a home environment. In one embodiment, the device 410 may include one or more sensors 412, a user interface component 14, a power supply 416 (e.g., including a power connection and/or battery), a network interface 418, a processor 420, and the like. Particular sensors 412, user interface components 414, and power-supply configurations may be the same or similar within each device 410. However, it should be noted that in some embodiments, each device 410 may include particular sensors 412, user interface components 414, power-supply configurations, and the like based on a device type or model.

The sensors 412, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals, or fields, or the like. As such, the sensors 412 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s), radiofrequency identification detector(s) and/or other suitable sensors. While FIG. 4 illustrates an embodiment with a single sensor, many embodiments may include multiple sensors. In some instances, the device 410 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives, security objectives, safety objectives, and/or smart-operation objectives.

One or more user interface components 414 in the device 410 may receive input from the user and/or present information to the user. The received input may be used to determine one or more settings. In certain embodiments, the user interface components may include a mechanical or virtual component that responds to the user's motion. For example, the user may mechanically move a sliding component (e.g., along a vertical or horizontal track) or rotate a rotatable ring (e.g., along a circular track), or move an object (e.g., finger) across/onto a touchpad of the device 410. Such motions may correspond to a setting adjustment, which can be determined based on an absolute position of a user interface component 414 or based on a displacement of a user interface components 414 (e.g., adjusting a set point temperature by 1 degree F. for every 10° rotation of a rotatable-ring component). Physically and virtually movable user interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user interface component may be associated with a magnitude of a setting adjustment, such that a user may dramatically alter a setting with a large movement or finely tune a setting with s small movement.

The user interface components 414 may also include one or more buttons (e.g., up and down buttons), a keypad, a number pad, a switch, a microphone, and/or a camera (e.g., to detect gestures). In some embodiments, the user interface component 414 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user interface component 414 may include a camera that may detect gestures (e.g., to indicate that a power or alarm state of a device is to be changed). In some instances, the device 410 may have one primary input component, which may be used to set a plurality of types of settings. The user interface components 414 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 410 to a power source such as a line voltage source. In some instances, an AC power source can be used to repeatedly charge a (e.g., rechargeable) local battery, such that the battery may be used later to supply power to the device 410 when the AC power source is not available.

The network interface 418 may include a component that enables the device 410 to communicate between devices. In one embodiment, the network interface 418 may communicate using an efficient network layer as part of its Open Systems Interconnection (OSI) model. In one embodiment, the efficient network layer, which will be described in more detail below with reference to FIG. 5, may enable the device 410 to wirelessly communicate IPv6-type data or traffic using a RIPng routing mechanism and a DTLS security scheme. As such, the network interface 418 may include a wireless card or some other transceiver connection.

The processor 420 may support one or more of a variety of different device functionalities. As such, the processor 420 may include one or more processors configured and programmed to carry out and/or cause to be carried out one or more of the functionalities described herein. In one embodiment, the processor 420 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. Further, the processor 420 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 420 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 420 may include image recognition technology to identify particular occupants or objects.

In certain embodiments, the processor 420 may also include a high-power processor and a low-power processor. The high-power processor may execute computational intensive operations such as operating the user interface component 414 and the like. The low-power processor, on the other hand, may manage less complex processes such as detecting a hazard or temperature from the sensor 412. In one embodiment, the low-power processor may wake or initialize the high-power processor for computationally intensive processes.

In some instances, the processor 420 may predict desirable settings and/or implement those settings. For example, based on the presence detection, the processor 420 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 420 may initiate an audio or visual indicator of where the person, animal or object is or may initiate an alarm or security feature if an unrecognized person is detected under certain conditions (e.g., at night or when lights are off).

In some instances, devices may interact with each other such that events detected by an instructed device influences actions of an instructed device. For example, an instructed device can detect that a user has pulled into a garage (e.g., by detecting motion in the garage, detecting a change in light in the garage or detecting opening of the garage door). The instructed device can transmit this information to an instructed device via the efficient network layer, such that the instructed device can, e.g., adjust a home temperature setting, a light setting, a music setting, and/or a security-alarm setting. As another example, an instructed device can detect a user approaching a front door (e.g., by detecting motion or sudden light pattern changes). The instructed device may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 410 may include a thermostat such as a Nest® Learning Thermostat. Here, the thermostat may include sensors 412 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user interface component 414. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off light switches or other electronic devices when it determines that the building is vacant. As such, the thermostat may use the network interface 418 to communicate with a light switch device such that it may send a signal to the light switch device when the building is determined to be vacant. In this manner, the thermostat may efficiently manage the energy use of the building.

Figure 5:
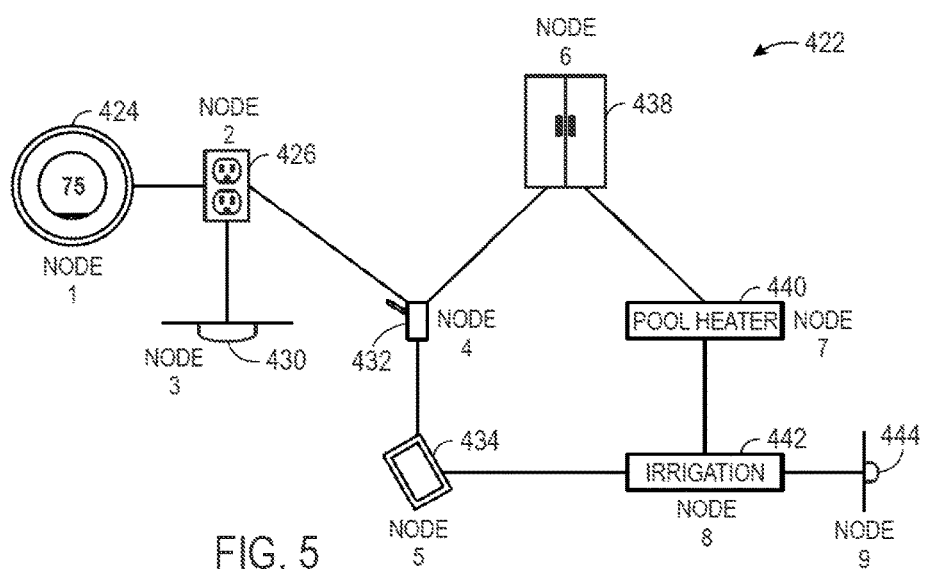
FIG. 5 illustrates a schematic view of devices interconnected within the smart-home environment, according to an embodiment.

Keeping the examples of FIGS. 1-4 in mind, FIG. 5 illustrates an example wireless mesh network 422 that may be employed to facilitate communication between some of the devices, such as those described above. As shown in FIG. 5, a thermostat 424 may have a direct wireless connection to a plug interface 426, which may be wirelessly connected to a hazard detection unit 430 and to a light switch 432. In the same manner, the light switch 432 may be wirelessly coupled to a portable electronic device 436 and an appliance 434. The appliance 438 may just be coupled to a pool heater 440 and the portable electronic device 434 may just be coupled to an irrigation system 442. The irrigation system 442 may have a wireless connection to an entryway interface device 444.

Figure 6:
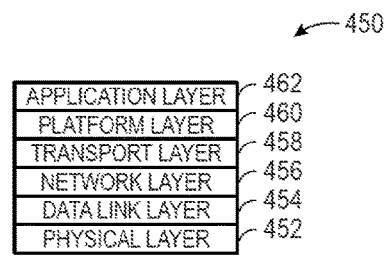
FIG. 6 illustrates a model view that illustrates functions of a communication system in layers including an application layer, a transport layer, and a network layer, according to an embodiment.

Generally, the network 422 may be part of an Open Systems Interconnection (OSI) model 450 as depicted in FIG. 6. The OSI model 450 illustrates functions of a communication system with respect to abstraction layers. That is, the OSI model may specify a networking framework or how communications between devices may be implemented. In one embodiment, the OSI model 450 may include six layers: a physical layer 452, a data link layer 454, a network layer 456, a transport layer 458, a platform layer 460, and an application layer 462. Generally, each layer in the OSI model 450 may serve the layer above it and may be served by the layer below it.

Keeping this in mind, the physical layer 452 may provide hardware specifications for devices that may communicate with each other. As such, the physical layer 452 may establish how devices may connect to each other, assist in managing how communication resources may be shared between devices, and the like.

The data link layer 454 may specify how data may be transferred between devices. Generally, the data link layer 454 may provide a way in which data packets being transmitted may be encoded and decoded into bits as part of a transmission protocol.

The network layer 456 may specify how the data being transferred to a destination node is routed. The network layer 456 may also interface with a security protocol in the application layer 462 to ensure that the integrity of the data being transferred is maintained.

The transport layer 458 may specify a transparent transfer of the data from a source node to a destination node. The transport layer 458 may also control how the transparent transfer of the data remains reliable. As such, the transport layer 458 may be used to verify that data packets intended to transfer to the destination node indeed reached the destination node. Example protocols that may be employed in the transport layer 458 may include Transmission Control Protocol (TCP) and User Datagram Protocol (UDP).

The platform layer 460 may establish connections between devices according to the protocol specified within the transport layer 458. The platform layer 460 may also translate the data packets into a form that the application layer 462 may use. The application layer 462 may support a software application that may directly interface with the user. As such, the application layer 462 may implement protocols defined by the software application. For example, the software application may provide serves such as file transfers, electronic mail, and the like.

Figure 7:
FIG. 7 illustrates an exchange of information between devices, with at least one device being part of the smart-home environment, according to an embodiment.

The network layer 456 may route data between the devices 10 using a communication protocol based on Internet Protocol version 6 (IPv6). As such, each device 410 may include a 128-bit IPv6 address that may provide each device 410 with a unique address to use to identify itself over the Internet, a local network or a fabric overlaying a group of networks, or the like. In some embodiments, the network layer 456 may identify a protocol (e.g., RIPng) that determines how data is routed between the devices. As illustrated in FIG. 7, using one or more layers, information 470 may be exchanged between devices 472 and 474.

Fabric Pairing Process

In some embodiments, a joining device may join a fabric using a commissioner via various communication paths (e.g., 802.11, 802.15.4, a combination of networks). Regardless of how communication is established between the joining device and its commissioner, there is a defined set of interactions which are performed, network provisioning, fabric joining, and service provisioning and account pairing. In some embodiments, these interactions are restricted to a specific order, such as network provisioning before fabric joining and fabric joining before service provisioning and account pairing. In some embodiments, some joining devices may only perform some of the interactions. For example, if the joining device is a radiator box that is provisioned for network and fabric access but is not provisioned for service access or explicitly paired to the user's account.

In some embodiments, the joining device may be paired to a fabric using assistance from a mobile device. The mobile device may employ a mobile application that is primarily responsible for acting as a commissioner and provisioning joining devices. In certain embodiments, any device on the network may act as the commissioner. In some embodiments, some devices (e.g., thermostats) support commissioning only to pair with subordinate devices (e.g., radiator boxes). In certain embodiments, some devices (e.g., hazard detectors devices) may provide a commissioner with network and fabric provisioning information, but they do not themselves commission new devices.

As previously discussed, in some scenarios, a process for pairing additional devices to a fabric may include user input to cause a commissioner to connect to the joining device's self-hosted WiFi access point using a mobile app. In such embodiments, the user manually disconnects from their current WiFi network to connect to the self-hosted AP, and the user manually rejoins their previous network once the new device has been provisioned. Therefore, such joining processes use substantial user interaction.

To free users from manually switching networks during the additional device pairing process, a new mechanism is used to securely connect the joining device to fabric devices via one or more networks (e.g., 802.15.4) so that network provisioning may occur via this connection. While the fabric devices and the joining device may rendezvous via WiFi, in some embodiments, the fabric devices would disconnect from the home's WiFi network to rendezvous with the joining device, disrupting regular service for the user and potentially creating a more invasive experience for the user. Instead, in network-assisted fabric joining a commissioner connects to the joining device through more than one network by connecting to an assisting device in a first network (e.g., 802.11) and relying on the assisting device to enable the commissioner to establish a tunnel to the joining device through another network (e.g., 802.15.4). Thus, as will be discussed below, the assisting device provides connectivity to the joining device through another network.

Figure 8:
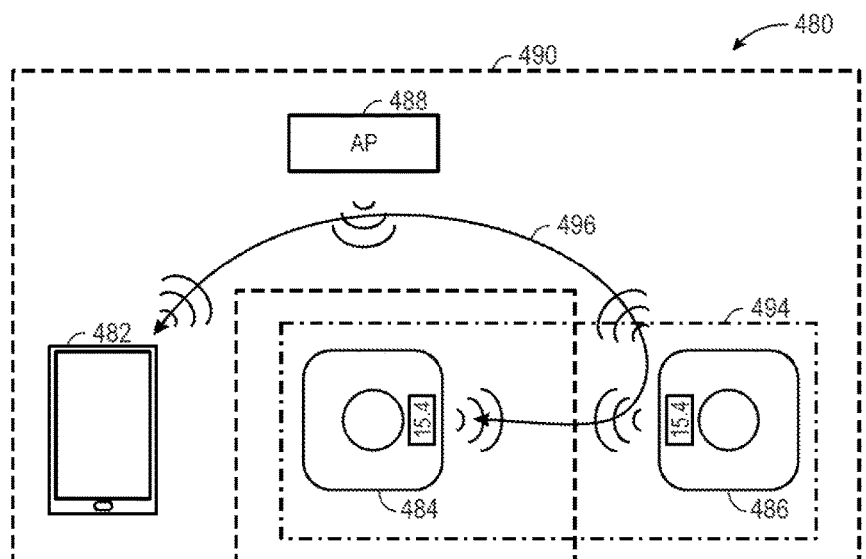
FIG. 8 illustrates a schematic view of a network-assisted fabric provisioning using an assisting device and a commissioner, according to an embodiment.

FIG. 8 illustrates a device connection scheme 480 including a commissioner 482. Although the commissioner is illustrated as a smart phone, the commissioner 482 may be any device (e.g., fabric device) suitable for controlling communications with a joining device 484 to be added to a fabric on which an assisting device 486 resides. The commissioner 482 connects to the assisting device 486 via an access point 488 for a network 490 (e.g., WiFi). As will be discussed below, the assisting device 486 then establishes a connection with the joining device 484 through another network 494 (e.g., 802.15.4). Through the assisting device 486, the commissioner 482 establishes a secure tunnel 496 with the joining device 484. As will be discussed below, the secure tunnel 496 enables the commissioner 482 and the joining device 484 to communicate securely without forcing the commissioner 482 to actually join a network which the joining device 484 resides and/or has created. In other words, the commissioner 482 may communicate with the joining device 484 even when the joining device 482 cannot readily join the network 490 with additional interaction with the joining device 482 without changing a network to which the commissioner 482 is connected. Thus, the commissioner 482 may provide a more streamlined interaction than a scenario in which the commissioner 482 joins the joining device 484 on a network created by the joining device 484 or on which the joining device 484 resides.

Figure 9A:
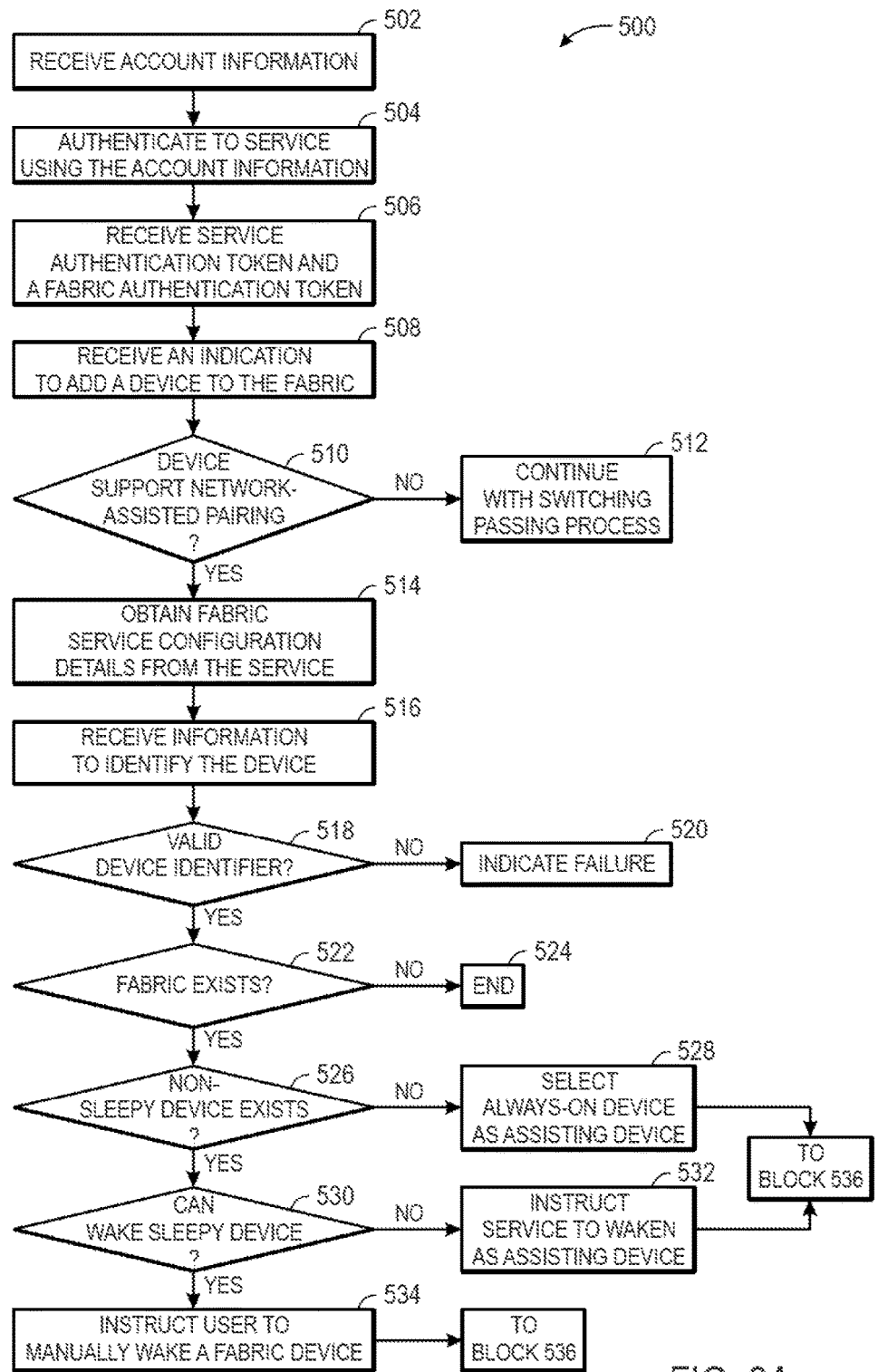
FIG. 9A illustrates a flowchart view of a first portion of a process for updating the device of FIG. 8 using the commissioner and assisting device of FIG. 8, according to an embodiment.
Figure 9B:
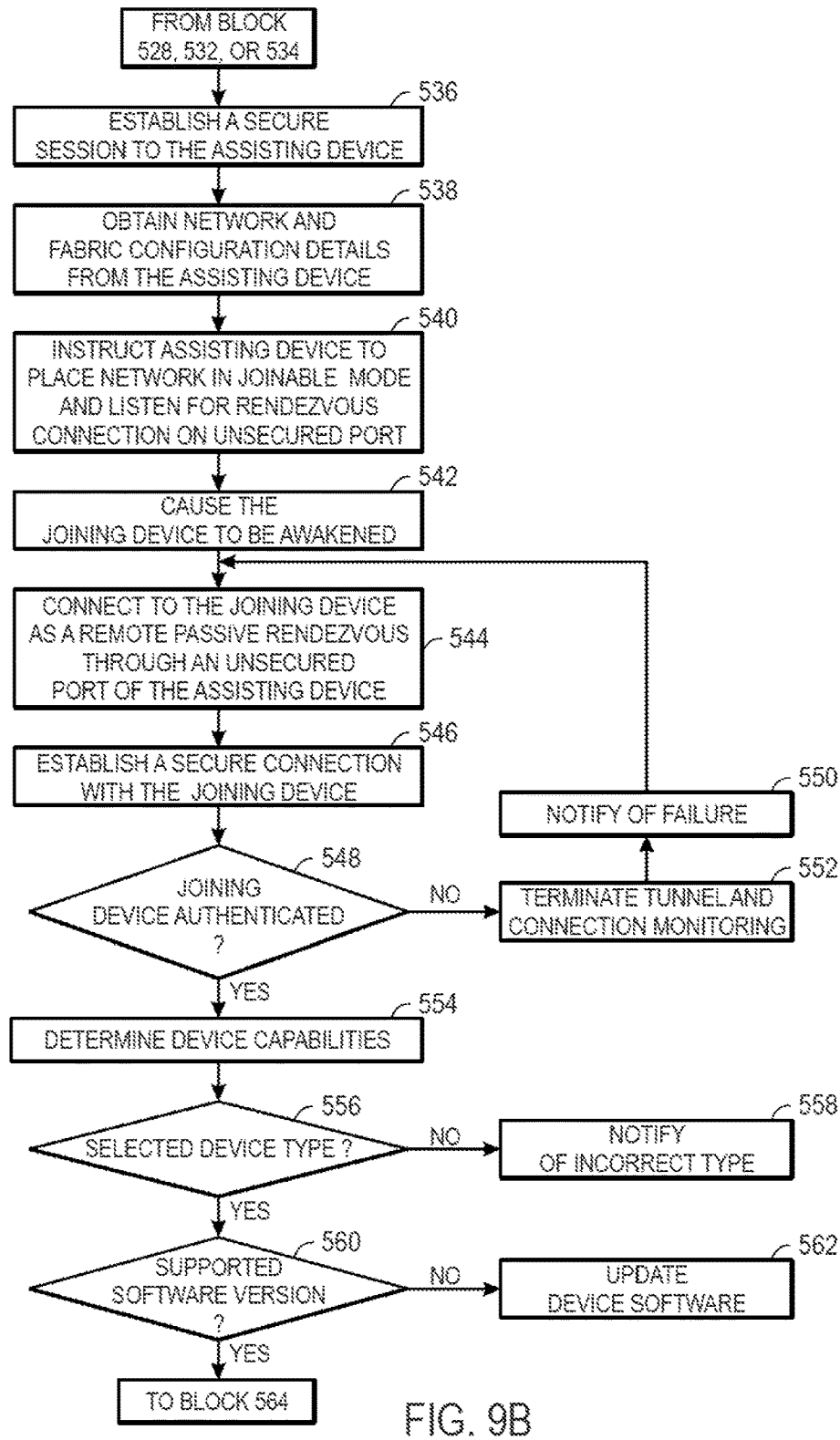
FIG. 9B illustrates a flowchart view of a second portion of a process for updating the device of FIG. 8 using the commissioner and assisting device of FIG. 8, according to an embodiment.
Figure 9C:
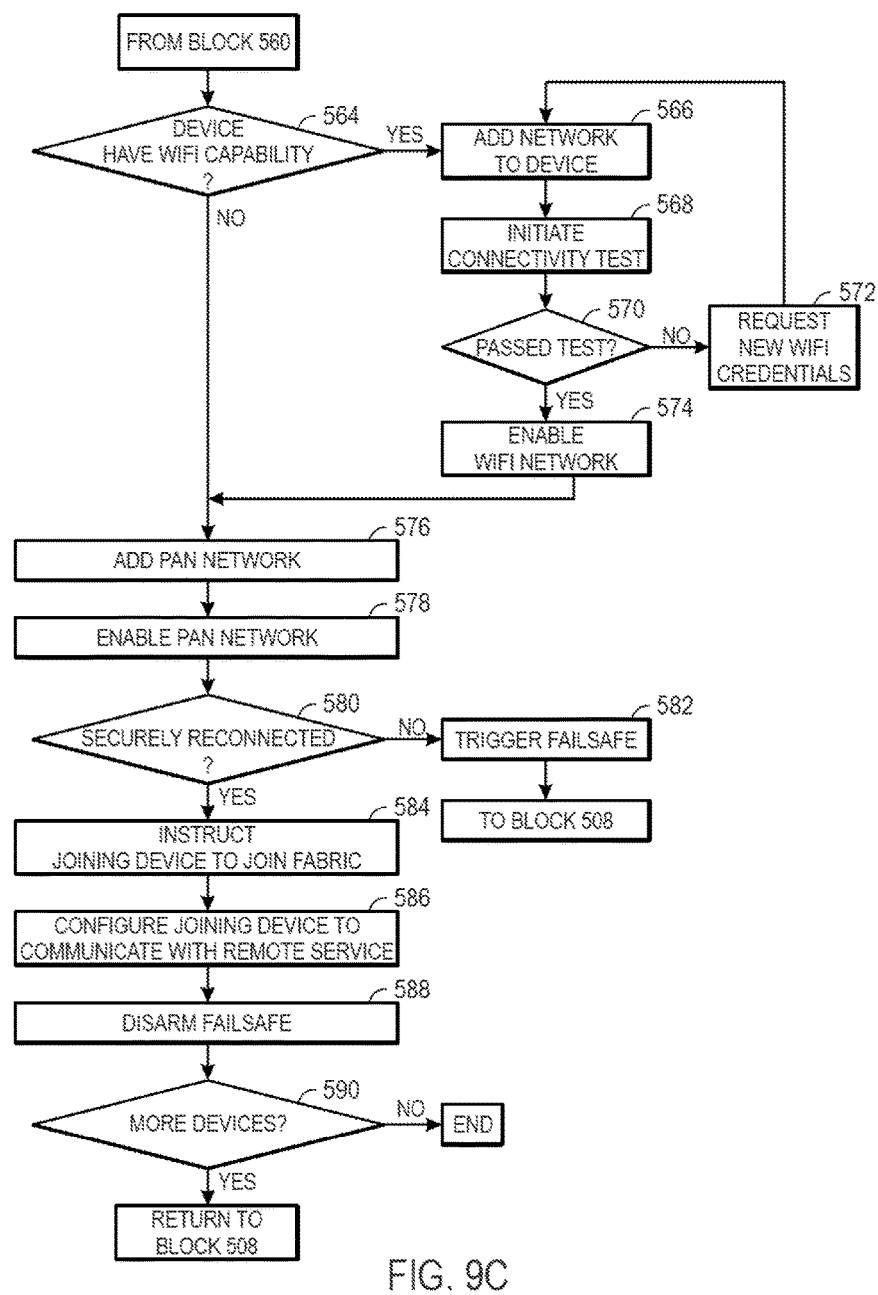
FIG. 9C illustrates a flowchart view of a third portion of a process for updating the device of FIG. 8 using the commissioner and assisting device of FIG. 8, according to an embodiment.

FIGS. 9A-9C illustrate a flow diagram of a pairing process 500 by the commissioner 482. The process 500 begins by the commissioner 482 receiving account information (block 502). For example, the commissioner 482 may obtain the account information from a user via a mobile device application program or a web browser. Additionally or alternatively, the commissioner 482 may retrieve the account information from storage on the commissioner 482 or remote from the commissioner 482 (e.g., stored in a remote service). Using the account information, the commissioner 482 authenticates to a remote service (block 504). In some embodiments, the account information may be stored in and retrieved from the remote service. In such embodiments, the commissioner 482 may authenticate to the service with authentication keys different than the account information and may retrieve the account information after authenticating to the remote service. After authentication in any method, the commissioner 482 receives a service authentication token and a fabric authorization token that are stored and may be used later (block 506). The commissioner 482 also receives an indication to add the joining device 484 to the fabric (block 508). For example, a user may select an add device button on the mobile device application or another suitable indication.

In some embodiments, the indication to add the joining device 484 includes an indication of a device type of the joining device 484. Using the device type, the commissioner 482 determines whether the joining device supports the pairing process 500. If the device type cannot support the pairing process 500, the commissioner 482 continues with a switching pairing process that uses switching of a network to which the commissioner 482 is connected (block 512). If the device type supports the pairing process 500, the commissioner 482 obtains fabric service configuration information from the service to be used in pairing the joining device 484 to the service and/or the fabric (block 514). The fabric service configuration information includes any information which may be helpful in pairing the joining device 484 to the fabric and the remote service. For example, the fabric service configuration information may include a service node ID for the joining device 484 (e.g., extended unique identifier EUI-64 format), a set of certificates for the service, a globally unique account id associated with the user's account, a DNS host name identifying an entry point for the remote service, and an opaque account pairing token that may be used to pair the joining device 484 to the remote service.

The commissioner 482 may also receive information to identify the joining device 484 (block 516). For example, the commissioner 484 may prompt the user to input a code associated with and/or found on the device and/or scan a code (e.g., QR code) found on the device to verify that the correct joining device is being paired to the fabric and/or the service. The commissioner 482 determines whether a device identifier is valid (block 518). For example, the commissioner 482 may determine whether a valid check digit exists or the identifier is an expected value. If the device identifier is not valid, the commissioner 482 indicates failure (block 520). For example, the commissioner 482 may display a notification to the user that the identifier is not valid and re-requests entry of the identifier.

If the identifier is valid, the commissioner 482 determines whether a fabric exists for a structure in which the joining device 484 is to be added (block 522). Such determination may include requesting the user to input a structure for the joining device 484, and the commissioner 482 determines whether a fabric exists for the structure. If no fabric exists, then the network-assisted pairing process ends since no assisting device exists (block 524). If a fabric exists, the commissioner 482 receives a response from the service. The response may include information about the fabric, such as device types, software versions, and node identifiers for the devices in the fabric, as well as a fabric identifier for the fabric.

If a pre-existing fabric exists, the commissioner 482 determines whether the devices in the fabric include non-sleepy devices (i.e., always-on devices that do not toggle into a relatively low power mode) (block 526). If there is at least one non-sleepy device, the commissioner 482 selects an always-on device as the assisting device 486 (block 528). If all devices in the fabric are sleepy devices, the commissioner 482 determines whether a sleepy device can be awoken by the service (block 530). If so, the commissioner 482 instructs the service to awaken the device as the assisting device 486 (block 532). If no devices may be awoken by the service, the commissioner 482 instructs the user to manually waken a device on the fabric (block 534). For example, the commissioner 482 may instruct the user to press a button on the assisting device 486.

Once an assisting device 486 has been selected and/or awoken, the commissioner 482 establishes a secure connection to the assisting device 486 using the fabric authentication previously received by the commissioner 482 in block 506 (block 536). In some embodiments, the secure session may be established using Certificate Authenticated Session Establishment (CASE) protocol as taught in U.S. patent application Ser. No. 14/508,933, titled "Authenticated Session Establishment," which was filed on Oct. 7, 2014, and which is incorporated by reference in its entirety. The commissioner 482 then stores the resulting session key and assisting device node identifier. In some embodiments, the commissioner 482 uses a device control profile, as discussed below, to employ connection monitoring on the connection between the commissioner 482 and the assisting device 486. Via the secure connection, the commissioner 482 extracts network and fabric configuration from the assisting device 486 (block 538). For example, the commissioner 482 may use network provisioning and fabric provisioning profiles to obtain this information. For example, the commissioner 482 may use Network and Fabric Provisioning Profiles as described in U.S. Provisional Patent Application No. 62/061,593, titled "Fabric Network," which was filed on Oct. 8, 2014, and which is incorporated by reference in its entirety. In certain embodiments, the commissioner 482 may receive a pre-share key (PSK) for the service or may rely on provisioning support to change the network handling to allow one to query a provisioning PSK. The commissioner 482 also instructs the assisting device 486 to place the network (e.g., 802.15.4) in a joinable mode and listen for rendezvous connections on an unsecured port (block 540). In some embodiments, the commissioner 482 then disables the device control profile connection monitor.

In some embodiments, the commissioner 482 causes the joining device 484 to be awoken and/or placed in a communicative state (block 542). For example, in some embodiments, the commissioner 482 may instruct a user to manually awaken the joining device 484 and/or send a signal over a predefined port to awaken the device from a relatively low-power state. As discussed below, the commissioner 482 connects to the joining device 484 as remote passive rendezvous (RPR) client and initiates a RPR using the device control profile (block 542). In some embodiments, connecting to the joining device 484 includes receiving a notification from the assisting device 486 that the assisting device 485 has rendezvoused with the joining device 484 and opened an RPR tunnel from the joining device 484 to the commissioner 482. The communications between the joining device 484 and the commissioner 482 will occur through the tunnel as forwarded by the assisting device 486 and its separate connections to the joining device 484 and the commissioner 482. Furthermore, the connection may include the commissioner 482 enabling device control profile connection monitoring between the joining device 484 and the commissioner 482.

After the rendezvous tunnel has been established, the commissioner attempts to establish a secure fabric session with the joining device 484 using a pairing code that is the device identifier, is derived from the device identifier, or corresponds to the device identifier (block 546). In some embodiments, the secure fabric session may be established using Password Authenticated Session Establishment (PASE) protocol as taught in U.S. patent application Ser. No. 14/508,933, titled "Authenticated Session Establishment," which was filed on Oct. 7, 2014, and which is incorporated by reference in its entirety. The commissioner determines whether the joining device 484 is authentic such that the PASE connection has been established successfully (block 548). If the joining device 484 is not authenticated, the commissioner 482 causes the termination of the tunnel and connection monitoring (block 550). In other words, the RPR session is terminated, and the commissioner will attempt to restart the RPR session using stored fabric and node information previously stored. In some embodiments, the commissioner 482 may notify of such failures (block 552). For example, the commissioner 482 may display a failure to a user to indicate the failure.

If the device authenticates, the commissioner 482 determines device capabilities and software versions before instructing the device to join a network (block 554). For example, the commissioner 482 may perform a fabric identify request to determine a device type and software version for the joining device 484. The commissioner 482 then verifies that the device type of the joining device 484 matches the selected device type used for the pairing (block 556). If the device types do no match, the commissioner 482 may notify the user of the failure and terminate the process 500 (block 558). In some embodiments, the commissioner 482 may restart the process 500 at block 508. If the selected device types match, the commissioner 482 may also determine whether the software version of the commissioner 482 supports network-assisted fabric pairing (block 560). If the version of software on the joining device 484 does not support network-assisted fabric pairing and/or needs to be updated, the commissioner 482 causes the software version to be updated (block 562). For example, the commissioner 482 may cause the joining device 484 to initiate an update and/or indicate to a user that the joining device 484 should be updated. Once the software version is appropriate for the fabric pairing, the commissioner 482 may determine whether the joining device 484 has WiFi capability (block 564). If the device has WiFi capability, the commissioner 482 causes the joining device 484 to add a WiFi network associated with the fabric (block 566). In other words, the joining device 484 stores network credentials (e.g., SSID and password) for the WiFi network. The commissioner 482 also causes the joining device 484 to initiate a connectivity test (block 568). For example, the commissioner 482 may instruct the joining device 484 to connect to the WiFi network, perform a DNS lookup, and establish a test TCP connection to an Internet-based test server. The commissioner 482 determines whether the connectivity test has passed (block 570). If the test failed, the commissioner 482 and/or the joining device may request new WiFi credentials (block 572) then reattempt the WiFi connection. In some embodiments, the joining device may reattempt to connect before requesting new WiFi credentials. If the test is passed, the commissioner 482 may request that the joining device 484 enable the WiFi network (block 574).

Regardless of WiFi capabilities, the commissioner 484 causes the joining device to add a personal area network (PAN) (block 576). The PAN credentials and name to be joined have been previously retrieved from the assisting device 486 and are shared with the joining device 484 by the commissioner 482. After the joining device 484 has the PAN credentials, the commissioner 482 causes the joining device 484 to enable the PAN network (block 578). In other words, the PAN is the secure connection version of the unsecured connection (e.g., via 802.15.4) over which the communication between the commissioner 482 and the joining device 484. If the secure re-connection between the joining device 484 and the commissioner 482 fails (block 580), the failsafe is triggered either through the unsecure port connection or automatically after a period of time elapses after the joining device 484 attempts to join the PAN (block 582).

Once the joining device 484 has joined the PAN, using the previously retrieve fabric ID and keys, the commissioner 482 instructs the joining device 484 to join the fabric (block 584). The commissioner 482 also configures the joining device 484 to communicate with the remote service by sending a register service request including the fabric service configuration information previously retrieved from the service (block 586). Since the pairing for the joining device 484 is complete, the commissioner 482 may disable a failsafe in the joining device to allow the fabric and network information to be stored persistently (block 588). The commissioner 482 then determines whether additional devices are to be added to the network and/or fabric (block 590). If there are no additional devices, the process 500 has ended. If there are additional devices, the commissioner 482 returns to block 508 of FIG. 9A.

Rendezvous Algorithm

As previously discussed, the network-assisted pairing rendezvous algorithm is the process by which a new fabric device (e.g., joining device 484) attempts to locate and connect to an existing fabric device (e.g., assisting device 486) for purposes of setup and provisioning the new fabric device. In other words, the network-assisted pairing rendezvous algorithm causes the new fabric device to provisionally join the right PAN, connect to the right existing device, and establish a secure fabric session with this device via PASE authentication.

Figure 10:
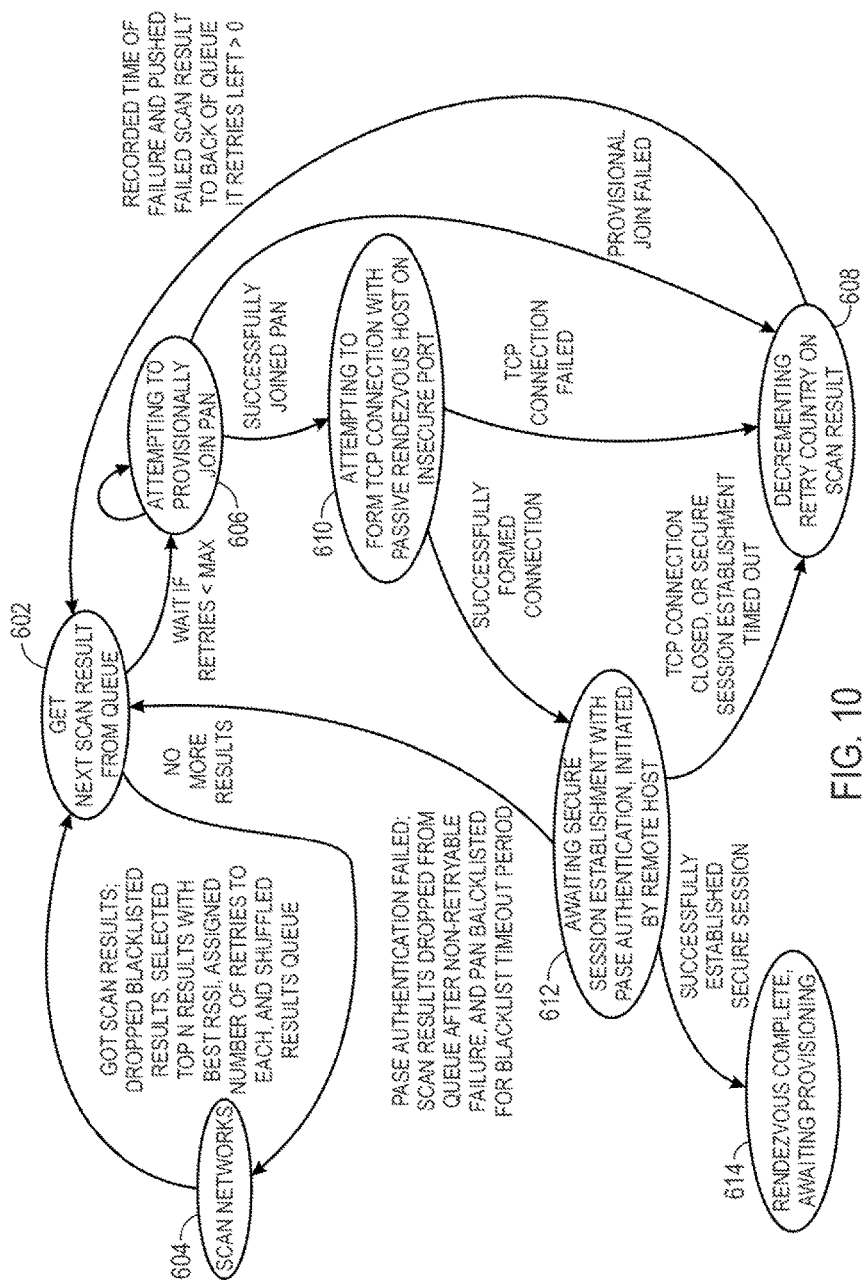
FIG. 10 illustrates a state machine for a rendezvous algorithm used in the process of FIGS. 91-9C, according to an embodiment.

FIG. 10 illustrates a state machine 600 for the rendezvous algorithm. As part of the algorithm, the new fabric device keeps a PAN blacklist and ordered list of scan results of PAN networks that includes a retry counter and timestamp for each scan result.

The algorithm may also include several tunable parameters: the number of results per scan queued for the attempted rendezvous, the number of rendezvous retries per result per scan, the rendezvous retry back off duration, the PAN blacklist size, and the PAN blacklist timeout duration. The number of results per scan queued for attempted rendezvous has several constraints, such an amount of memory available on the rendezvousing device, a desire for a new device to avoid attempting rendezvous with every PAN in an environment. In other words, this constraint keeps the number of scan results queued for attempted rendezvous at a desirable size, so that the new device does not try to rendezvous with existing devices on PANs with low signal strengths which are not likely to contain the desired rendezvous host.

Another constraint on the number of results per scan is the estimated number of PANs visible to a typical new device with signal strengths higher than the right PAN. If there are too many strong-signal "false positive" PANs, the number of results per scan queued for attempted rendezvous may be sufficiently large or the new device may not connect to the right PAN. In some embodiments, the value of this parameter may be between 10-20 scan results.

In some embodiments, scanning for networks is slow and is to be avoided whenever possible. If a new device attempts to rendezvous with an existing device on a given PAN and this attempt is unsuccessful for reasons other than PASE authentication failure, the PAN may be the right PAN but unable to complete the rendezvous attempt because the existing device was busy talking to a different new device. In this case, in some embodiments, the other new device's rendezvous attempt is bound to fail, and in much less time than it would take for the first new device to perform another network scan. Thus, in some embodiments, the first new device may delay its next scan, and retry its rendezvous later. The parameters which determine when and how often the instructed device will retry its rendezvous are the rendezvous retry back off duration and rendezvous retry per-PAN, per-scan maximum.

The critical path of the rendezvous process is the PASE authentication procedure, as only one device may attempt PASE authentication with the commissioner 482 via RPR at a time. The length of the rendezvous retry back off duration will thus be based on the duration of a typical PASE authentication attempt, such that one device will retry a failed rendezvous attempt with a given existing device as soon as another new device's rendezvous attempt with that existing device would likely have failed. The number of rendezvous retries may be large enough for the new device to reap the benefits of delaying its scan when queued for a rendezvous attempt, while also small enough for the new device to re-scan eventually in case it missed its rendezvous PAN in an earlier scan attempt. In some embodiments, the value of this parameter may be between 3-5 retries per result per scan.

If a new device's rendezvous attempt is unsuccessful due to PASE authentication failure, the new device may assume that it will not be able to rendezvous with the rendezvous host on this particular PAN within a given period, and add this PAN to its blacklist. The purpose of the PAN blacklist is for a device which knows it cannot rendezvous with anyone on a particular PAN to back off so that other devices may attempt to rendezvous with that PAN's rendezvous host. The size of the PAN blacklist may be determined in relation to an amount of memory available on the rendezvousing devices. For example, the PAN blacklist may be similar in size to the number of results per scan queued for attempted rendezvous.

In some embodiments, PANs on the blacklist may be removed from the blacklist after a set timeout to handle the case where the user sequentially pairs more than one additional device. In this case, though the commissioner 482 may attempt to rendezvous with only one device at a time, other new devices whose turns it will soon be to pair may also be awake and attempting to rendezvous. These other new devices may fail PASE authentication with the right existing device on the right PAN before it is their turn to rendezvous. When their turn comes, however, these devices may be able to connect to the same device on the same PAN for which PASE authentication may have failed for them previously. Thus the blacklist timeout may be close to the shortest expected amount of time taken by the user to rendezvous with, provision, and set up any fabric device. For example, in some embodiments, this timeout maybe set to between 1-2 minutes. For some devices whose pairing interactions are shorter, the timeout value may be reduced over devices with longer pairing interaction times.

In some embodiments, the user may be directed by the commissioner 482 to wake only one new device at a time for additional device pairing, so the blacklist may be largely unnecessary. The common case in which the blacklist is intended to cover is that in which the user simultaneously wakes, e.g. button-presses, many new devices which they intend to pair one by one.

This algorithm will succeed quickly in the simple case where only a single joiner is present and only a single joinable PAN is visible. Assuming all joiners adhere to this algorithm, more difficult cases with multiple joiners and/or multiple joinable PANs may take longer.

In the future, it may be desirable to implement a feature which enables the user to batch-pair many new additional Fabric devices. The existing rendezvous algorithm and Remote Passive Rendezvous mechanism could be adapted for this use case by extending the RPR server's MAC address filtering capability. In addition to rejecting rendezvous participants with non-matching MAC addresses, the RPR server could pass the MAC address of each new device to the RPR client, such that the latter could select the pairing code with which to authenticate each new device via J-PAKE and the PASE protocol. In this scenario, the network-assisted pairing rendezvous algorithm would work without any modification, and the RPR client would not iterate through the full list of possible pairing keys when attempting to authenticate each new device.

Returning to FIG. 10 with the foregoing in mind, the state machine 600 includes an initial state where the joining device 484 gets the next scan result from its queue (block 602). If the queue is empty, the joining device 484 scans for networks (block 604). The joining device 484 gets the scan results, drops the blacklisted results, selects the top N results based on maximum results constraint, assigns a number of retries to each result, and shuffles the result queue. The first scan result is obtained from the queue. The joining device attempts to provisionally join the PAN from the queue (block 606). If the attempt is unsuccessful and the retries are less than the constraint, the joining device attempts to retry to join the PAN. If the attempt is unsuccessful and the number of retries is greater than the constraint, the provisional joining has failed. When the attempt has failed the joining device 484 decrements the retry counter on the scan result (block 608) and gets a new scan result.

However, if the provisional joining of the PAN is successful, the joining device 484 attempts to form a TCP connection with the rendezvous host (e.g., assisting device 486) on unsecure port (block 610). If the TCP connection fails, the joining device 484 decrements the retry counter on the scan result and gets a new scan result. If the TCP connection is successfully completed, the joining device 484 awaits a secure session establishment from the assisting device 486 (block 612). If the connection closes or the secure session establishment times out, the joining device 484 decrements the retry counter on the scan result and gets a new scan result. If the secure session is successfully established, the rendezvous is complete and the joining device 484 awaits provisioning and pairing as described in FIGS. 9A-9C (block 614).

Device Control Profile

The Device Control Profile allows one device acting as a client (e.g., commissioner 482) to request that another device acting as a server (e.g., assisting device 486 and/or joining device 484) exercise a specified device control capability. In other words, the profile enables devices to remotely access fabric functionality on remote devices where the fabric functionality may be used for the new device setup and provisioning process. Device control capabilities are as any action, behavior, or state modification which one fabric device may request of another in relation to new device setup and provisioning.

1. Reset Configuration

One device may instruct another to reset any combination of its network, fabric, or service configurations to a known state, such as in the case where the instructed device detects a partial misconfiguration of the instructed device during the pairing and setup process.

2. Arm/Disarm Failsafe

One device may instruct another to arm or disarm a device configuration failsafe. As previously discussed, if armed, the failsafe indicates to the instructed device that total configuration details should be reset to a known state in the event of setup or provisioning failure. For example, if a connection between two devices fails during network provisioning, the joining device forgets all configuration details.

3. Enable/Disable Connection Monitor

One device may instruct another to enable a fabric echo-based connection liveness monitor on a TCP, UDP, or other suitable connection between these devices. The instructed device may send echo requests on the monitored connection at intervals specified by the instructing device. Both devices start timers when the connection monitor is enabled and restart these timers whenever they receive an echo message. If either of these timers expires, the device which owns the expired timer may consider the connection terminated. In some embodiments, the instructing device specifies the duration of this inactivity timeout.

4. Remote Passive Rendezvous

As previously discussed, n instructing device may instruct another to create a TCP-layer (or UDP) tunnel between the instructing device and a joining device to rendezvous with the instructed device on the instructed device's unsecured fabric port. This tunnel may consist of two TCP and/or UDP connections: one from the instructing device to the instructed device and one from the instructed device to the joining (i.e., rendezvoused) device. The instructed device may send data that comes in over one of these connections out over the other, and similarly mirror connection closures and half-closures. This functionality enables the instructed device to perform fabric provisioning on the rendezvoused device such that the two devices might interact even when not on the same network.

Protocol Sequence Diagrams

Device Control Profile interactions may vary by device control capability. Common to all interactions. However, each interaction includes a device control server and a device control client. Device control clients initiate protocol interactions with device control servers. In some embodiments, each device control server may not be capable to implement all described capabilities. If the device control server receives a message requesting a capability which it does not support, the device control server may return a core profile status report with the request's exchange ID and an "unsupported message" status code. For example, the commissioner 482 may use a Status Report scheme that is part of a Core Profile as described in U.S. Provisional Patent Application No. 62/061,593, titled "Fabric Network," which was filed on Oct. 8, 2014, and which is incorporated by reference in its entirety. Devices which act as device control servers may also act as device control clients, and vice-versa.

1. Reset Configuration

Figure 11:
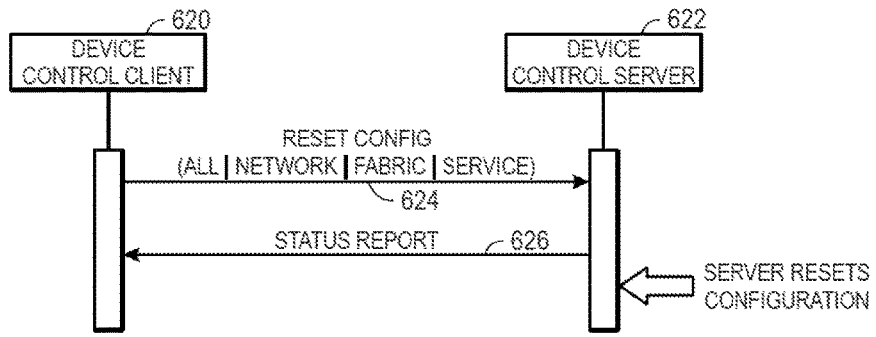
FIG. 11 illustrates a protocol sequence diagram view of a reset configuration interaction, according to an embodiment.

FIG. 11 illustrates a sequence diagram for a reset configuration request. A device control client 620 may instruct a device control server 622 to reset any combination of the server's network, fabric, or service configurations to a known state. This is a single request-response interaction. First, the client 620 may send the server a reset configuration request 624 whose body contains flags indicating which configurations to reset. The server 622 may then prepare to reset the specified configurations, and send the client 620 a core profile status report 626 to indicate success or a device control profile "unsupported failsafe mode" status report to indicate failure.

After the server 622 responds with a core profile status report 620 to indicate success, the server may reset the specified configurations. In some embodiments, the server 622 cannot reset its configurations before it responds to the client's request, as to do so may render it unable to communicate further with the client.

2. Arm Failsafe

Figure 12:
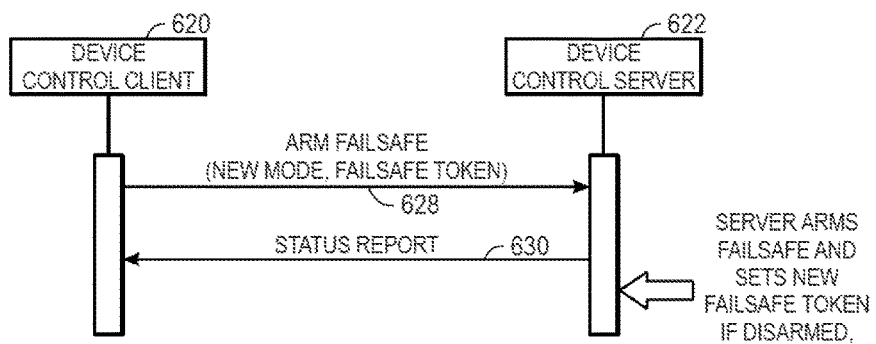
FIG. 12 illustrates a protocol sequence diagram view of an new arm failsafe interaction, according to an embodiment.

FIG. 12 illustrates a sequence diagram for a new arm failsafe request. A device control client 620 may request that a device control server 622 arm its configuration failsafe. This is a single request-response interaction. As discussed below in relation to data frames, an arm request 628 may include an 8-bit arm mode enumeration value and a 32-bit failsafe token. The failsafe token may be unique to each fabric provisioning attempt, and indicate to new device control clients whether another client has already armed that server's failsafe as part of an in-progress provisioning process.

The failsafe arm modes include New, Reset, and Resume Existing. A New arm request 628 may arm the server's failsafe and set its failsafe token to the value provided in the client's request if the failsafe is not already armed, and fail otherwise. If a New arm request 628 succeeds, the server 622 may send the client 620 a core profile status report 630 to indicate success. If a New arm request 628 fails because the server's failsafe is already active, the server 622 may send the client 620 a device control profile "failsafe already active" status report 630. If a New arm request 628 fails for some other reason, the server 622 may send the client an appropriate core profile status report 630.

Figure 13:
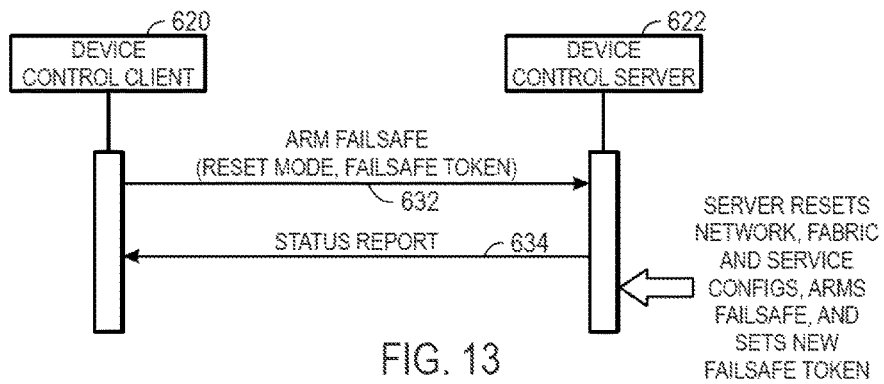
FIG. 13 illustrates a protocol sequence diagram view of a reset arm failsafe interaction, according to an embodiment.

FIG. 13 illustrates a sequence diagram for a Reset arm request. A Reset arm request 632 may reset the server's network, fabric, and/or service configurations, arm the failsafe regardless of its prior state or any existing failsafe token, and/or set the failsafe token to the value provided in the client's request. If a Reset arm request 632 succeeds, the server 622 may send the client 620 a core profile status report 634 to indicate success. If a Reset arm request 632 fails, the server 622 may send the client 620 an appropriate core profile status report 634.

Figure 14:
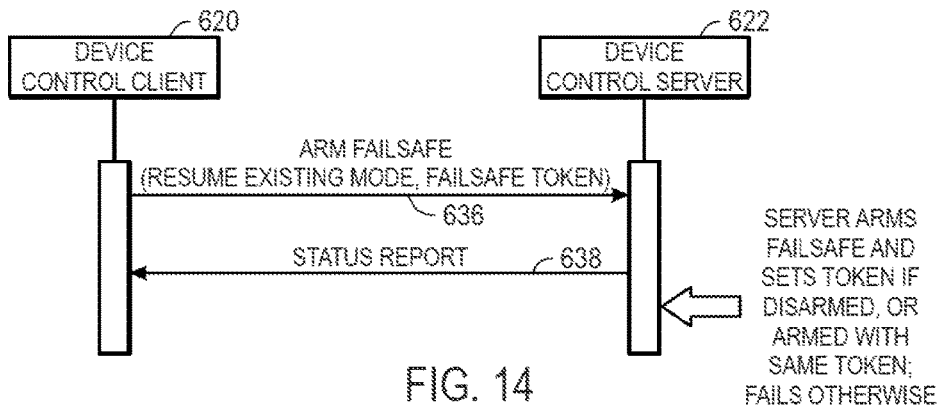
FIG. 14 illustrates a protocol sequence diagram view of a resume arm failsafe interaction, according to an embodiment.

FIG. 14 illustrates a sequence diagram for a Resume Existing arm failsafe request. A Resume Existing arm request 636 may arm the failsafe and set the failsafe token to the value provided in the client's request if the failsafe is not already armed, or succeed if the failsafe is already armed with the specified failsafe token, and fail otherwise. If a Resume Existing arm request 636 succeeds, the server 622 may send the client 620 a core profile status report 638 to indicate success. If a Resume Existing arm request 636 fails because the server's failsafe is already armed with a failsafe token other than that provided by the client 620, the server 622 may send the client 620 a device control profile "no matching failsafe active" status report 638. If a Resume Existing arm request 636 fails for some other reason, the server 622 may send the client 620 an appropriate core profile status report 638.

A device control client 620 may use the Resume Existing arm mode in the case where it reconnects to a new, partially provisioned device after a period of network disconnection. If the Resume Existing request succeeds with the client's earlier failsafe token, the client 620 may assume that no other device has taken over the new device's provisioning process. If the Resume Existing request fails, the client 620 may assume that another device has taken over the new device's provisioning process, and that the client 620 device should not attempt to provision the new device unless its failsafe becomes disarmed and it remains unprovisioned.

If the server 622 receives an arm failsafe message with an unknown arm mode, it may send the client 620 a device control profile "unsupported failsafe mode" status report.

3. Disarm Failsafe

Figure 15:
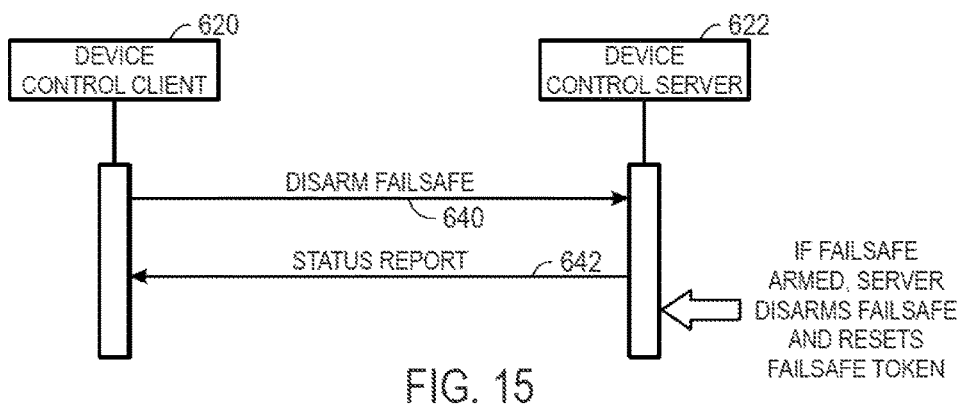
FIG. 15 illustrates a protocol sequence diagram view of a disarm failsafe interaction, according to an embodiment.

FIG. 15 illustrates a sequence diagram for a disarm failsafe request. A device control client 620 may request that a device control server 622 disable its configuration failsafe. In some embodiments, this is a single request-response interaction. The client 620 sends the server 622 a disarm failsafe request 640. If the server's failsafe is armed, the server 622 disarms the failsafe, clears the failsafe token, and sends the client 620 a core profile status report 642 message to indicate success. If the server's failsafe is disarmed, it sends a device control profile "no failsafe active" status report 642.

4. Enable/Disable Connection Monitor

Figure 16:
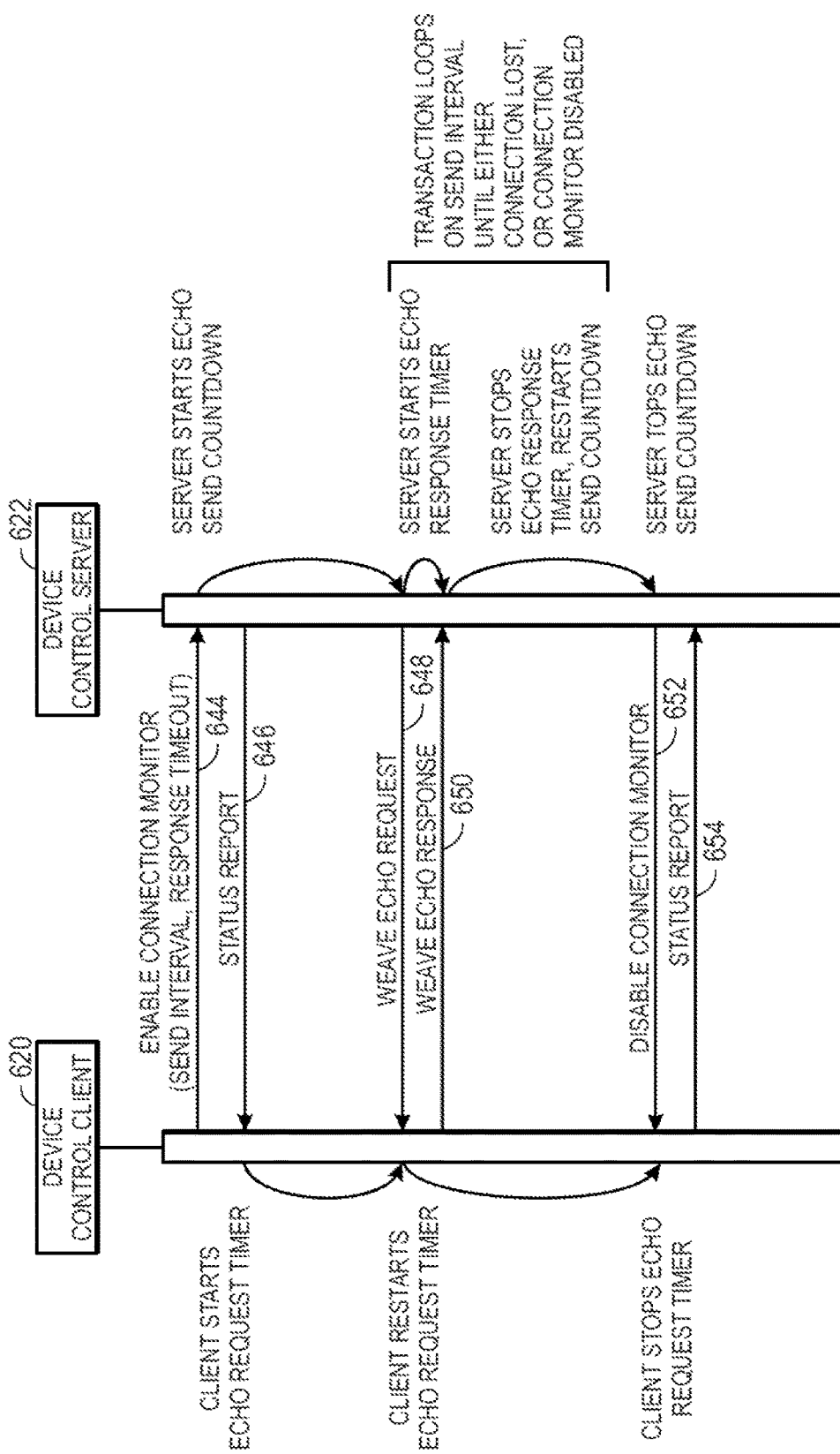
FIG. 16 illustrates a protocol sequence diagram view of an enable connection monitor interaction, according to an embodiment.

FIG. 16 illustrates a sequence diagram for a connection monitor. A device control client 620 may request 644 that a device control server 622 enables a fabric echo-based connection liveness monitor on a TCP (or UDP) connection between the server 622 and the client 620. The client's request 644 to enable connection monitoring may specify the interval in milliseconds between each of the server's attempts to send echo requests, as well as the response timeout to be used by the server for each echo request sent. The response timeout is defined as the threshold duration during which no communication occurs across the monitored connection before either side may consider the connection closed. For proper operation of the connection monitor, the fabric echo send interval must be smaller than the response timeout. The connection to be monitored is that over which the client sends the enable connection monitor request.

If the server 622 accepts the client's request 644 to enable connection monitoring, it may respond with a core profile status report 646 to indicate success, and create a new exchange ID for fabric echo messages sent over the monitored connection. Fabric echo requests 648 from the server 622 to the client 620, as well as fabric echo responses from 650 the client 620 to the server 622, may be sent with the new exchange ID. If the server 622 fails to enable connection monitoring, the server 622 may respond with an appropriate core profile status report 646 to indicate failure.

After the server 622 accepts the client's request 644 to enable connection monitoring, it may start a timer with a duration of the send interval from the client's request 644. When this timer expires, the server 622 may send a fabric echo request 648 to the client over the monitored connection using the new exchange ID created for this purpose. This echo request 648 may be sent with the response timeout received by the server 622 as part of the client's initial request 644. If this timeout expires, the server 622 may consider the monitored connection terminated and close its side of the connection. If there is already one echo request outstanding when the send timer expires, the server 622 may refrain from sending another.

After the client 620 receives a successful status report 646 from the server in response to its request 644 to enable connection monitoring, the client 620 may start a timer with a duration of the response timeout sent to the server 622. If this timer expires, the client 620 may consider the monitored connection terminated and close its side of the connection.

When the client 620 wishes to disable connection monitoring on a given connection, it may send the server 622 a disable connection monitor request 652 over that connection. The server 622 may then disable the monitor for this connection if enabled, cancel all timers for this connection monitor and send the client 620 a core profile status report 654 to indicate success or failure. The server 622 may respond to a disable connection monitor request 652 with a core profile success status report 654 if no connection monitor is enabled on the specified connection.

5. Remote Passive Rendezvous Request

Figure 17:
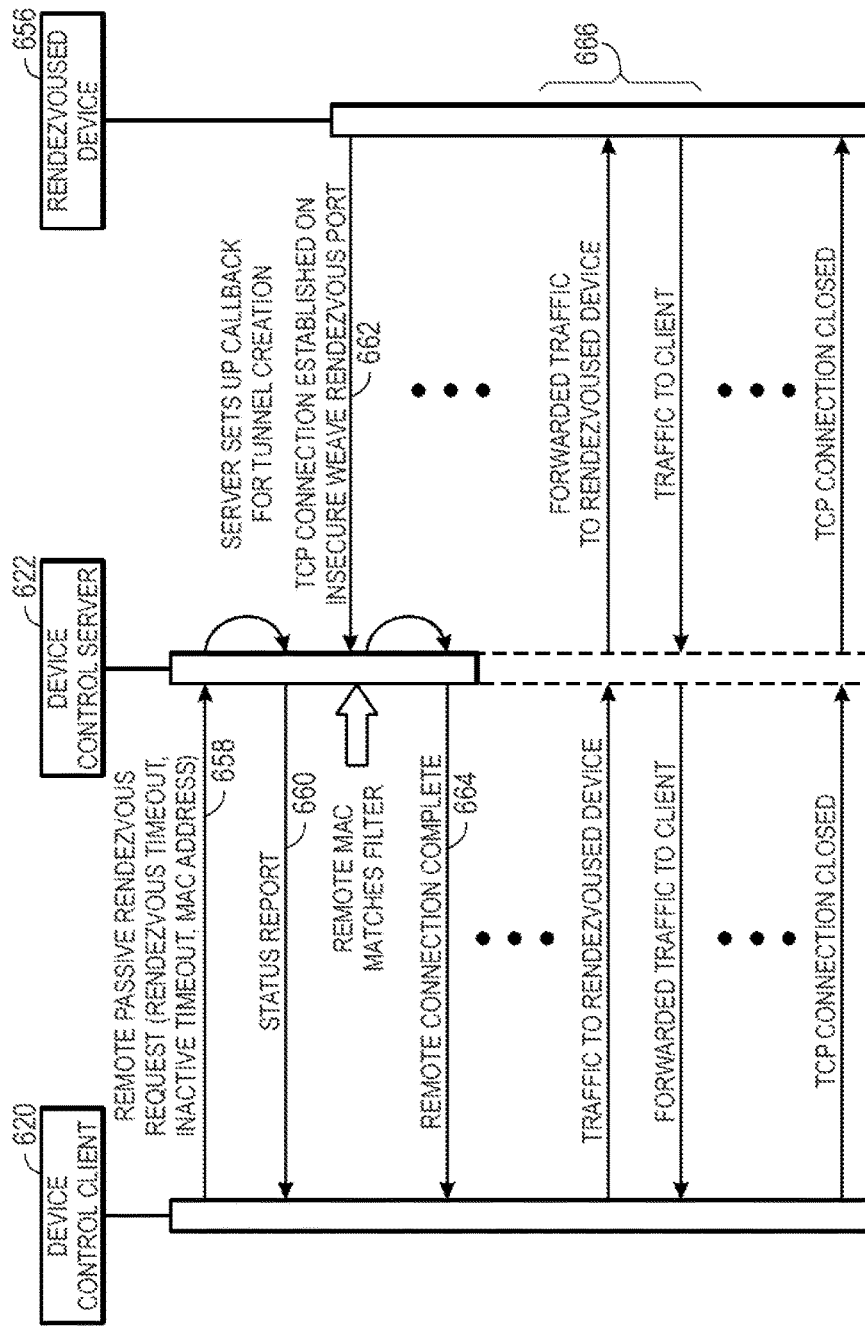
FIG. 17 illustrates a protocol sequence diagram view of a remote passive rendezvous interaction, according to an embodiment.

FIG. 17 illustrates a sequence diagram for a remote passive rendezvous request. A device control client 620 may instruct a device control server 622 to create a TCP-layer tunnel between the client 620 and a rendezvoused device 656 to rendezvous with the server 622 on its unsecured fabric port. The unsecured fabric port is a predefined port over which all fabric protocol traffic is treated as unsecured at the network layer. The tunnel between the client 620 and rendezvoused device 656 may consist of two TCP connections: one from the client 620 to the server 622, and one from the server 622 to the rendezvoused device 656. The server 622 may send all data that comes in over one connection out over the other, and similarly mirror connection closures and half-closures.

The client 620 to perform a remote passive rendezvous may first send the server an RPR request 658 over an established TCP connection. The request 658 may contain a timeout value which indicates how long the server 622, if it accepts the client's request, may listen for a rendezvous connection on the unsecured fabric port. The request 658 may also include an inactivity timeout which indicates how long the server 622 may wait to terminate the tunnel after receiving no data over its connection to either the client 622 or rendezvoused device 656. If the rendezvous timeout expires before the server 622 accepts an unsecured rendezvous connection 662, the server 622 may stop listening for such a connection on the client's behalf and close the connection over which the client sent its RPR request 658. Finally, the request 658 may also contain a fabric node ID value which the server 622 may use to filter unsecured rendezvous connections. The filtering is transparent from the client's perspective (i.e. the server will not connect the client 620 to a rendezvoused device 656 with an incorrect node ID). In some embodiments, a null value indicates that the server should not use node ID filtering. If the server 622 accepts the client's RPR request 656, the TCP connection over which this request 658 was sent may eventually become the connection over which the server 622 forwards traffic between the client 620 and the rendezvoused device 656.

When the server 622 receives the client's RPR request 658, it may register the client 620 as its RPR listener and respond with a core profile status report 660 to indicate success if the server 622 is already listening for rendezvous connections on the unsecured fabric port and/or another client 622 is not already registered with the server as its RPR listener. Otherwise the server 622 may respond with a core profile status report 660 to indicate failure. The server 622 may have only one registered RPR listener at a time.

In some embodiments, the device control profile does not include a method to instruct the device control server 622 to listen for rendezvous connections on the unsecured Fabric port. Instead, in such embodiments, that functionality is provided by the Network Provisioning Profile.

When the client 620 receives a successful status report 660 in response to an RPR request 658, it may keep open the TCP (or UDP) connection over which it sent this request 658 until either the rendezvous timeout expires or the server 622 closes this connection. The client 620 may send no further fabric message or other data over this connection until it receives a remote connection complete message 664 from the server 622. If the client 620 detects that the rendezvous timeout from its RPR request 658 has expired, it may close its connection to the server 622.

If the rendezvous timeout specified in the client's RPR request 658 expires before the server 622 accepts a rendezvous connection on behalf of the client 620, the server 622 may stop listening for such a connection on the client's behalf and close the connection over which the client sent its RPR request 658. If the server 622 receives a rendezvous connection before the rendezvous timeout expires, it may cancel this timeout. The server 622 may discard any data received from the client 620 over the RPR connection after a successful status report 660 has been sent in response to the client's RPR request and before the server 622 has sent the client 620 a remote connection complete message.

If the server 622 accepts a rendezvous connection on the unsecured fabric port while it listens for such connections on the client's behalf, the server 622 first compares the rendezvoused device's fabric node ID to that specified in the client's RPR request 658, if any. If the IDs match or the client-specified node ID is null, the server 622 may deregister the client 620 as an RPR listener and send the client 620 a remote connection complete message 664 via the same TCP connection over which it received the client's RPR request 658. If the client-specified node ID is non-null and does not match that of the rendezvoused device 656, the server 622 may immediately close its connection with the rendezvoused device 656 and resume listening for unsecured rendezvouses on the client's behalf.

The remote connection complete message 664 indicates that the client 620 may now send and receive data over this connection to and from the rendezvoused device 658. Once this message 664 has been sent, the tunnel between the client 620 and rendezvoused device 656 is considered to have been established.

The server 622 sends the remote connection complete message 664 before it starts forwarding data 666 between the client 620 and rendezvoused device 656. If the rendezvoused device 656 sends data over its connection to the server 622 before the remote connection complete message 664 has been sent to the client 620, the server 622 buffers the data from the rendezvoused device 656 and sends it to the client 620 immediately after it sends the remote connection complete message 664. In some embodiments, once the server 622 has sent the remote connection complete message 664, it may no longer send non-forwarded data (i.e. data of its own origin over its connections to the client 620 and rendezvoused device 656).

The rendezvoused device 656 is agnostic of whether the device with whom it exchanges packets over the rendezvoused TCP connection differs from the fabric node with whom it actually exchanges messages over this connection.

After the tunnel has been established, if the server 622 does not receive data from either side of the tunnel within the inactivity timeout period specified in the client's RPR request, the server 622 may consider the tunnel terminated and close its connections to both the client 620 and the rendezvoused device 656. To avoid unwanted tunnel termination as the result of this timeout, the client 620 and rendezvoused device 656 may enable active connection monitoring between them.

When the client 620 or rendezvoused device 656 closes their connection with the server 622, the server 622 may close its connection with the other tunnel participant and consider the tunnel terminated. If the client 620 or rendezvoused device 656 closes only the read or write side of their connection to the server, the server 622 may close only the read or write side of its connection to the other tunnel participant, and consider the tunnel alive until either it times out due to inactivity or the remaining open side of the connection is closed.

Fabric Application Header

In order for a device control profile frame to be properly recognized and handled, the fabric application header identifies the frame as such. For example, messages using the device control profile include a fabric application header (e.g., 0x00000006) for device control profile frames. All messages in reset configuration, arm/disarm failsafe, and enable/disable connection monitor protocol interactions may share an exchange ID of the message sent by the device control client to initiate the interaction illustrating that the communications are all related. Fabric echo requests and responses used to determine connection liveness may share the exchange ID selected for this purpose by the device control server for each echo message sent. The exchange ID of the remote connection complete message sent to the device control client by the device control server as part of a remote passive rendezvous interaction is undefined, as the client does not send any message to the device control server in response. In some embodiments, at least some data frames may have no message body and purely rely upon information in the headers of the applications.

A message type field of the fabric application header may have one of the following set of values for Device Control Profile frames:

TABLE 1

Device Control Profile message types

| Value | Message Type |
|---|---|
| 0x01 | reset configuration |
| 0x02 | arm failsafe |
| 0x03 | disarm failsafe |
| 0x04 | enable connection monitor |
| 0x05 | disable connection monitor |
| 0x06 | remote passive rendezvous request |
| 0x07 | remote connection complete |
| 0x08-0xff | reserved |

Table 2 illustrates status codes that may be used related to failsafe messages:

TABLE 2

Status codes

| Value | Status Code |
|---|---|
| 0x0001 | Failsafe already active |
| 0x0002 | No failsafe active |
| 0x0003 | No matching failsafe active |
| 0x0004 | Unsupported failsafe mode |
| 0x0005 | Success, but expect connection to close |

1. Reset Configuration Frame

Figure 18:
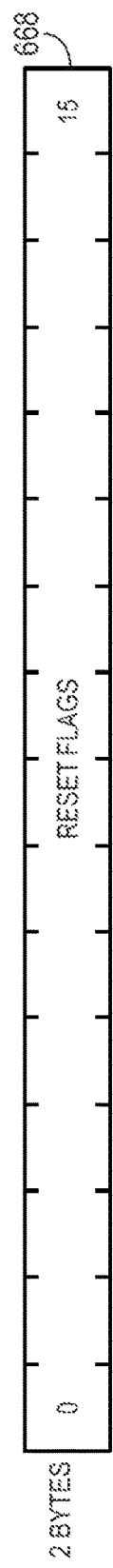
FIG. 18 illustrates a schematic view of a reset configuration data frame, according to an embodiment.

FIG. 18 illustrates a data frame for a reset configuration data frame. As illustrated, the reset configuration data frame 668 includes 2 bytes of data that is used as flags to indicate which targets are to be reset and may be similar to those values illustrated in Table 3 below:

TABLE 3

| Value | Flag |
| --- | --- |
| 0x00FF | reset all configurations |
| 0x0001 | reset network configuration |
| 0x0002 | reset fabric configuration |
| 0x0004 | reset service configuration |
| 0x8000 | full factory reset |

Reset configuration values

2. Arm Failsafe Frame

Figure 19:
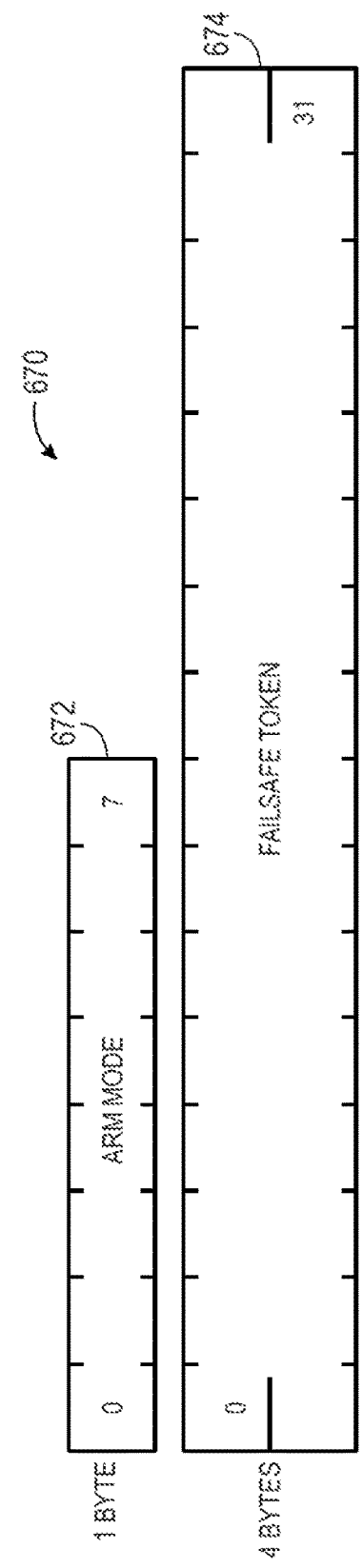
FIG. 19 illustrates a schematic view of an arm failsafe data frame, according to an embodiment.

FIG. 19 illustrates a data frame for an arm failsafe data frame. As illustrated, the arm failsafe data frame 670 includes an arm mode field 672 that includes 1 byte of data that is used as flags to indicate which failsafe mode is to be used and may be similar to those values illustrated in Table 4 below:

TABLE 4

| Value | Arm mode |
| --- | --- |
| 0x01 | New |
| 0x02 | Reset |
| 0x03 | Resume Existing |

Arm failsafe values

The arm failsafe frame 670 also includes a failsafe token 674 that may be used to identify the arm failsafe request and validate it. The failsafe token 674 may be a 4-byte arbitrary value unique to each fabric provisioning attempt.

3. Enable Connection Monitor Frame

Figure 20:
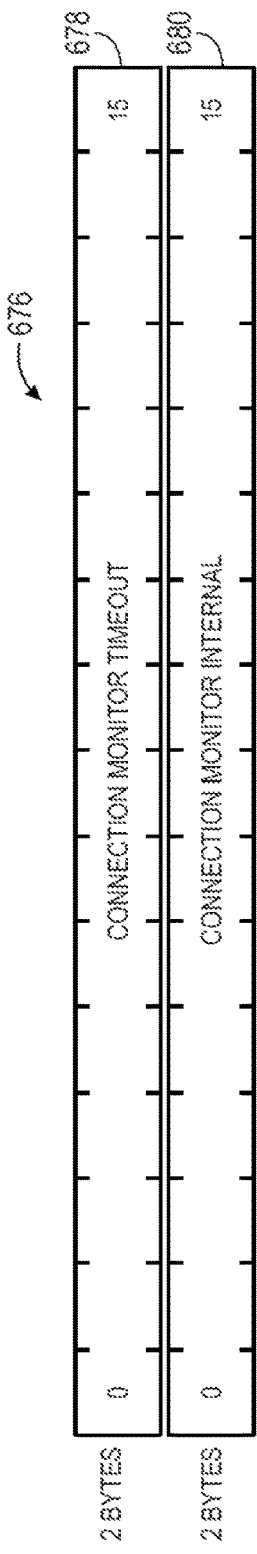
FIG. 20 illustrates a schematic view of an enable connection monitor data frame, according to an embodiment.

FIG. 20 illustrates a data frame for an enable connection monitor frame. As illustrated, the enable connection monitor frame 676 includes a connection monitor timeout 678 and a connection monitor interval 680. In some embodiments, both the connection monitor timeout 678 and the connection monitor interval 680 include 2 bytes of data. The connection monitor timeout 678 indicates how long a connection can remain idle before timing out. The connection monitor interval 680 indicates how often echo requests are sent.

4. Remote Passive Rendezvous Request Frame

Figure 21:
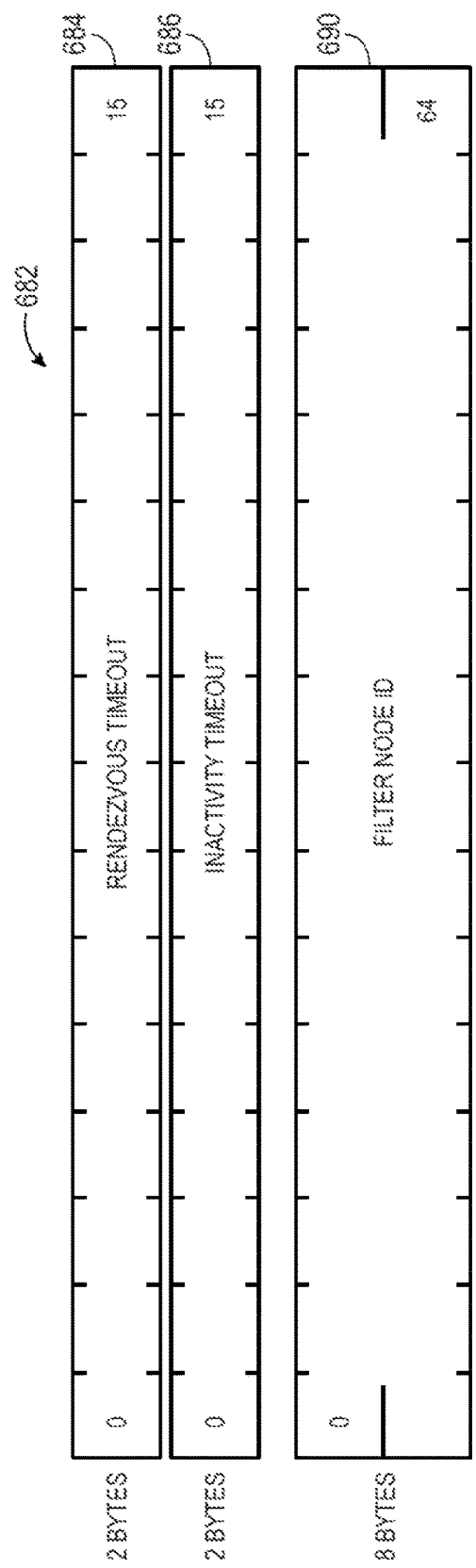
FIG. 21 illustrates a schematic view of a remote passive rendezvous request data frame, according to an embodiment.

FIG. 21 illustrates a remote passive rendezvous request frame. The remote passive rendezvous request frame 682 includes a rendezvous timeout field 684 and an inactivity timeout field 686. The rendezvous and inactivity timeouts may be 16-bit unsigned integer values in seconds. The rendezvous timeout field 684 indicates how long the attempt may remain open, and the inactivity timeout field 686 indicates how long inactivity may occur on the RPR connection before closing the connection. The remote passive rendezvous request frame 682 also includes a filter node ID 688. In some embodiments, the filter node ID 688 includes 8 bytes that may be used to verify that the rendezvoused joining device is the correct device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method for joining a device to a fabric, comprising:
connecting to an assisting device through an unsecure port in a first local area network, wherein the assisting device resides on the fabric and is configured to assist the device in joining the fabric;
connecting, via an access point of a second local area network, to a commissioning device through the connection to the assisting device, wherein the assisting device connects to the commissioning device through the second local area network, and wherein the commissioning device is configured to manage access to the fabric;
receiving fabric credentials for the fabric via the connection to the commissioning device;
based on the receiving the fabric network credentials, activating a failsafe flag that is configured to block the device from storing the fabric network credentials or network information for fabrics or networks to which the device is unable to connect or complete a successful connectivity test; and
joining the fabric using the received fabric credentials.

2. The method of claim 1, comprising:
obtaining first local area network credentials for the first local area network from the commissioning device via the assisting device; and
joining the first local area network using the first local area network credentials received from the commissioning device.

3. The method of claim 2, comprising:
obtaining second local area network credentials for the second local area network from the commissioning device via the assisting device; and
joining the second local area network using the second local area network credentials received from the commissioning device.

4. The method of claim 3, comprising:
initiating a connectivity test for the second local area network by:
performing a domain name system (DNS) lookup; and
establishing a transmission control protocol (TCP) connection to a test server via a gateway for the second local area network, wherein the second local area network type comprises an 802.11 network type.

5. The method of claim 4, wherein if the initiated connectivity test is unsuccessful by failing to successfully complete a DNS lookup or failing to establish a TCP connection to the test server:
re-initiating the connectivity test; or
requesting new credentials for the second local area network from the commissioning device or the assisting device.

6. The method of claim 1, comprising:
receiving, from the commissioning device, fabric service configuration information, wherein the fabric service configuration information contains information with which devices in the fabric connect to a remote service; and
connecting to the remote service using the fabric service configuration information after connecting to the fabric.

7. The method of claim 1, comprising:
authenticating identity of the device by sending a device identifier to the commissioning device for the device with which the device verifies identity upon connection to the commissioning device; and
establishing a secure communication with the commissioning device through a secure tunnel through the assisting device using the device identifier.

8. The method of claim 1, comprising receiving an awaken command before connecting to the assisting device or connecting to the commissioning device, wherein the awaken command comprises:
an electronic command from the commissioning device, the assisting device, or a remote service; or
actuation of a button on the device.

9. An electronic device comprising:
a network interface;
memory;
a processor configured to cause the electronic device to:
connect to an assisting device through an unsecure port in a first local area network via the network interface, wherein the assisting device resides on a fabric network and is configured to assist the electronic device in joining the fabric network;
connect, via an access point of a second local area network, to a commissioning device through the connection to the assisting device, wherein the assisting device connects to the commissioning device through the second local area network, and wherein the commissioning device is configured to manage access to the fabric network;
receive fabric credentials for the fabric network via the connection to the commissioning device;
upon receipt of the fabric network credentials, activate a failsafe flag that is configured to block the electronic device from storing the fabric network credentials or network information for fabrics or networks to which the electronic device is unable to connect or complete a successful connectivity test; and
join the fabric network using the received fabric credentials.

10. The electronic device of claim 9, wherein the processor is configured to cause the electronic device to:
obtain first local area network credentials for the first local area network from the commissioning device via the assisting device;
join the first local area network using the first local area network credentials received from the commissioning device;
obtain second local area network credentials for the second local area network from the commissioning device via the assisting device; and
join the second local area network using the second local area network credentials received from the commissioning device.

11. The electronic device of claim 10, wherein the processor is configured to cause the electronic device to securely reconnect to the commissioning device directly via the second local area network or indirectly through the assisting device via a combination of the first local area network and the second local area network using the second local area network credentials or the first local area network credentials.

12. The electronic device of claim 9, wherein the processor is configured to cause the electronic device to:
determine if the failsafe flag has remained active for a pre-determined period of time after the failsafe flag has been activated; and
if the failsafe flag has remained active for the pre-determined period of time, delete any received fabric or network configuration details.

13. The electronic device of claim 12, wherein the processor is configured to cause the electronic device to reset the failsafe flag if the processor determines that the electronic device has successfully connected to the fabric, the first local area network, or the second local area network to successfully complete a connectivity test.

14. The electronic device of claim 9, wherein the processor is configured to cause the electronic device to:
determine if the electronic device is unable to connect to the fabric, the first local area network, or the second local area network to successfully complete a connectivity test; and
if the connectivity test fails to verify a connection to the commissioning device or a test server through the fabric, the first local area network, or the second local area network, delete any received fabric or network configuration details.

15. The electronic device of claim 14, wherein the processor is configured to cause the electronic device to reset the failsafe flag if the processor determines that the electronic device has successfully connected to the fabric, the first local area network, or the second local area network to successfully complete a connectivity test.

16. Non-transitory, computer-readable medium having stored thereon instructions, which when executed by a processor are configured to cause a joining device to:
connect to an assisting device through an unsecure port in a first local area network, wherein the assisting device resides on the fabric and is configured to assist the joining device in joining the fabric;
connect, via an access point of a second local area network, to a commissioning device through the connection to the assisting device, wherein the assisting device connects to the commissioning device through the second local area network, and wherein the commissioning device is configured to manage access to the fabric;
receive fabric credentials for the fabric via the connection to the commissioning device;
upon receipt of the fabric network credentials, activate a failsafe flag that is configured to block the joining device from storing the fabric network credentials or network information for fabrics or networks to which the joining device is unable to connect or complete a successful connectivity test; and
join the fabric using the received fabric credentials.

17. The non-transitory, computer-readable medium of claim 16, wherein the instructions are configured to cause the joining device to:
receive first local area network credentials for the first local area network;
save the first local area network credentials;
test connectivity to the commissioning device via the first local area network using the first local area network credentials; and
if connectivity test passes:
persistently store the first local area network credentials; and
enable communications via the first local area network.

18. The non-transitory, computer-readable medium of claim 16, wherein connecting to the commissioning device through the assisting device comprises establishing a secure communication session with the commissioning device by authenticating the identity of the joining device using a pairing code corresponding to a device identifier for the joining device and negotiating session keys using the pairing code.

19. The non-transitory, computer-readable medium of claim 17, wherein the instructions are configured to cause the processor to:

obtain second local area network credentials for the second local area network from the commissioning device via the assisting device; and join the second local area network credentials received from the commissioning device.

20. The non-transitory, computer-readable medium of claim 16, wherein the instructions are configured to cause the joining device to:

receive, from the commissioning device, fabric service configuration information, wherein the fabric service configuration information contains information with which devices in the fabric connect to a remote service; and connect to the remote service using the fabric service configuration information after connecting to the fabric.

21. The non-transitory, computer-readable medium of claim 16, wherein the instructions are configured to cause the joining device to:

determine if the failsafe flag has remained active for a pre-determined period of time after the failsafe flag has been activated; and if the failsafe flag has remained active for the pre-determined period of time, delete any received fabric or network configuration details.

22. The non-transitory, computer-readable medium of claim 21, wherein the instructions are configured to cause the joining device to reset the failsafe flag if the processor determines that the joining device has successfully connected to the fabric, the first local area network, or the second local area network to successfully complete a connectivity test.

* * * * *